United States Patent
Cheng et al.

(10) Patent No.: US 12,101,238 B2
(45) Date of Patent: Sep. 24, 2024

(54) DATA TRANSMISSION PERFORMANCE DETECTION

(71) Applicant: Huawei Technologies Co., Ltd., Shenzhen (CN)

(72) Inventors: Jian Cheng, Nanjing (CN); Yanfang Zhang, Nanjing (CN); Yan Bai, Beijing (CN); Liang Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 167 days.

(21) Appl. No.: 16/730,465

(22) Filed: Dec. 30, 2019

(65) Prior Publication Data
US 2020/0136944 A1    Apr. 30, 2020

Related U.S. Application Data

(63) Continuation of application No. PCT/CN2018/084961, filed on Apr. 27, 2018.

(30) Foreign Application Priority Data

Jun. 30, 2017 (CN) .......................... 201710526008.5
Jul. 6, 2017 (CN) .......................... 201710546444.9

(51) Int. Cl.
*H04L 43/08* (2022.01)
*H04L 1/08* (2006.01)
(Continued)

(52) U.S. Cl.
CPC ................ *H04L 43/08* (2013.01); *H04L 1/08* (2013.01); *H04L 5/0055* (2013.01); *H04L 69/22* (2013.01); *H04L 69/326* (2013.01)

(58) Field of Classification Search
CPC ......... H04L 43/08; H04L 1/08; H04L 5/0055; H04L 69/22; H04L 69/326
(Continued)

(56) References Cited

U.S. PATENT DOCUMENTS

2005/0213586 A1*   9/2005   Cyganski ................ H04L 47/27
                                                            370/395.41
2007/0064611 A1    3/2007   He
                            (Continued)

FOREIGN PATENT DOCUMENTS

CN          1842033 A       10/2006
CN          1937541 A       3/2007
                            (Continued)

OTHER PUBLICATIONS

Jaiswal, S., et al., "Measurement and Classification of Out-of-Sequence Packets in a Tier-1 IP Backbone," XP055678782, Jan. 1, 2002, 12 pages.
(Continued)

*Primary Examiner* — Cheikh T Ndiaye
*Assistant Examiner* — Ayele F Woldemariam
(74) *Attorney, Agent, or Firm* — Conley Rose, P.C.

(57) ABSTRACT

A method for implementing transmission performance detection includes: after successively receiving data packets whose sequence numbers are N1 and N2, determining, by a detection apparatus, that N2 is greater than N1 and that N1 and N2 are inconsecutive; after receiving the data packet whose sequence number is N2, receiving a data packet whose sequence number is M1; and when determining N1<M1<N2 and T2−T1>=RTT, determining that the data packet whose sequence number is M1 is a retransmitted packet corresponding to an upstream packet loss, where T1 is a time for receiving the data packet whose sequence number is N2, T2 is a time for receiving the data packet whose sequence number is M1.

20 Claims, 10 Drawing Sheets

(51) Int. Cl.
*H04L 5/00* (2006.01)
*H04L 69/22* (2022.01)
*H04L 69/326* (2022.01)

(58) Field of Classification Search
USPC .......................................................... 709/224
See application file for complete search history.

(56) References Cited

U.S. PATENT DOCUMENTS

| | | | | |
|---|---|---|---|---|
| 2007/0070916 | A1* | 3/2007 | Lehane | H04L 43/18 |
| | | | | 370/252 |
| 2009/0168723 | A1* | 7/2009 | Meylan | H04L 47/10 |
| | | | | 370/331 |
| 2009/0310500 | A1* | 12/2009 | Matsuda | H04L 43/0864 |
| | | | | 370/252 |
| 2012/0300648 | A1* | 11/2012 | Yang | H04L 1/20 |
| | | | | 370/252 |
| 2015/0109942 | A1* | 4/2015 | Nguyen | H04L 43/12 |
| | | | | 370/252 |
| 2015/0304380 | A1* | 10/2015 | Muramoto | H04L 65/65 |
| | | | | 709/219 |
| 2016/0006634 | A1 | 1/2016 | Li et al. | |
| 2017/0187846 | A1* | 6/2017 | Shalev | G06F 15/17331 |

FOREIGN PATENT DOCUMENTS

| | | | |
|---|---|---|---|
| CN | 101321092 | A | 12/2008 |
| CN | 103152223 | A | 6/2013 |
| CN | 106506124 | A * | 3/2017 |
| CN | 106656642 | A | 5/2017 |
| EP | 1429490 | A1 | 6/2004 |
| EP | 1865646 | A1 | 12/2007 |
| EP | 2922241 | A2 | 9/2015 |
| WO | 2012062102 | A1 | 5/2012 |

OTHER PUBLICATIONS

Ericsson, "Requirement Proposal for Extended Cell Range," 3GPP TSG-RAN WG4 (Radio) Meeting #39, R4-060436, Shanghai, China, May 8-12, 2006, 4 pages.

Paxson, V., et al., "Computing TCP's Retransmission Timer," RFC 6298, Jun. 2011, 11 pages.

* cited by examiner

DATA TRANSMISSION PERFORMANCE DETECTION

CROSS-REFERENCE TO RELATED APPLICATIONS

This is a continuation of Int'l Patent App. No. PCT/CN2018/084961 filed on Apr. 27, 2018, which claims priority to Chinese Patent App. No. 201710546444.9 filed on Jul. 6, 2017 and Chinese Patent App. No. 201710526008.5 filed on Jun. 30, 2017, which are incorporated by reference.

TECHNICAL FIELD

Embodiments of the present disclosure relates to the field of communications technologies, and in particular, to a method for detecting transmission performance, an apparatus, and a system.

BACKGROUND

Reliable transport protocols are widely used in a network (for example, the Internet). Two such protocols are Transmission Control Protocol (TCP) and Stream Control Transmission Protocol (SCTP). At present, traffic of at least 80% of services on the Internet, for example, a video service and a download service, is transmitted based on the TCP protocol. In the network, when there is a relatively severe transmission performance problem, for example, when there is a relatively severe packet loss or latency, service quality may decline. Therefore, network performance detection is important for evaluating the service quality.

In some approaches, generally, each network device reports statistics information of a received packet (for example, a receiving time of the packet or a quantity of received packets) to an evaluation device, and the evaluation device determines a network performance indicator such as a packet loss or a latency based on the statistics information uploaded by each network device, for example, determines a latency between two network devices based on times at which the two network devices receive a same packet and that are uploaded by the two network devices.

When performing the network performance detection, each network device needs to report the statistics information obtained by the network device to the evaluation device, and consequently, it is complex to implement the network performance detection and efficiency is relatively low.

SUMMARY

Embodiments of the present disclosure provide a method for implementing transmission performance detection, an apparatus, and a system, to resolve a problem that the transmission performance detection efficiency is relatively low.

According to a first aspect, a method for implementing transmission performance detection is provided. The method includes: after successively receiving data packets whose sequence numbers are N1 and N2 and that are sent by a sending device through a connection that is based on a reliable transport protocol and that is established between the sending device and a receiving device, determining, by a detection apparatus, that N2 is greater than N1 and that N1 and N2 are inconsecutive; after receiving the data packet whose sequence number is N2, receiving, by the detection apparatus, a data packet whose sequence number is M1; and when determining that M1 is greater than N1 and is less than N2 and that T2−T1 is greater than or equal to a round-trip time (RTT), determining, by the detection apparatus, that the data packet whose sequence number is M1 is a retransmitted packet corresponding to an upstream packet loss, where T1 is a time at which the detection apparatus receives the data packet whose sequence number is N2, T2 is a time at which the detection apparatus receives the data packet whose sequence number is M1, the RTT is a two-way latency between the sending device and the receiving device, and the upstream packet loss is a packet loss occurring between the sending device and the detection apparatus.

According to the method provided in the first aspect of the present disclosure, by identifying a sequence number of a received data packet and a time at which the data packet is received, the detection apparatus can perform packet loss detection itself, so that implementation is easy and efficiency is relatively high.

When M1 is greater than N1 and less than N2, the data packet whose sequence number is M1 may be the retransmitted packet corresponding to the upstream packet loss, or may be an out-of-order packet. Correspondingly, during specific implementation, the method may further include: when determining that M1 is greater than N1 and less than N2 and that T2−T1 is less than the RTT, determining, by the detection apparatus, that the data packet whose sequence number is M1 is an out-of-order packet.

In this implementation, the out-of-order packet can be identified. Therefore, packet loss misdetection can be eliminated, so that packet loss detection can be implemented more accurately, and in addition, an out-of-order situation can be detected, so that transmission performance detection can be implemented more comprehensively and accurately.

In an implementation of the first aspect, a data packet whose sequence number is N3 and the data packet whose sequence number is M1 are two data packets successively received by the detection apparatus, where N3 is greater than or equal to N2; and the method may further include: when determining that M1 is less than N3 and does not belong to any sequence number black hole before the data packet whose sequence number is M1, determining, by the detection apparatus, that the data packet whose sequence number is M1 is a data packet corresponding to a downstream packet loss, where the sequence number black hole is a sequence number range bounded by sequence numbers of a pair of data packets that are successively received but whose sequence numbers are inconsecutive.

In this implementation, by identifying a sequence number of a received data packet, the detection apparatus can conveniently perform downstream packet loss detection itself, thereby implementing transmission performance detection comprehensively and efficiently.

After a detection period ends, the detection apparatus may further determine an upstream packet loss rate in the detection period based on a quantity of lost upstream packets detected in the detection period, where the quantity of lost upstream packets is a quantity of data packets that are lost between the sending device and the detection apparatus. In this implementation, accurate and intuitive detection data can be provided for the transmission performance evaluation.

According to a second aspect, a method for implementing transmission performance detection is provided. The method is applied to a communications system, the communications system includes a sending device, a receiving device, and a transmission device, the sending device and the receiving device transmit a packet through a connection that is based on a reliable transport protocol and that is established between the sending device and the receiving device, the packet is transmitted by using the transmission device, and the method includes: after successively receiving data packets whose sequence numbers are N1 and N2 and that are sent by the sending device through the connection, determining, by the transmission device, that N2 is greater than N1 and that N1 and N2 are inconsecutive; after receiving the data packet whose sequence number is N2, receiving, by the transmission device, a data packet whose sequence number is M1; and when determining that M1 is greater than N1 and is less than N2 and that T2−T1 is greater than or equal to an RTT, determining, by the transmission device, that the data packet whose sequence number is M1 is a retransmitted packet corresponding to an upstream packet loss, where T1 is a time at which the transmission device receives or sends the data packet whose sequence number is N2, T2 is a time at which the transmission device receives or sends the data packet whose sequence number is M1, the RTT is a two-way latency between the sending device and the receiving device, and the upstream packet loss is a packet loss occurring between the sending device and the transmission device.

During specific implementation, generally, T1 is the time at which the communications unit receives the data packet whose sequence number is N2, and T2 is the time at which the communications unit receives the data packet whose sequence number is M1; alternatively, T1 is the time at which the communications unit sends the data packet whose sequence number is N2, and T2 is the time at which the communications unit 710B sends the data packet whose sequence number is M1.

In a first possible implementation of the second aspect, the method may further include: when determining that M1 is greater than N1 and that T2−T1 is less than the RTT, determining, by the transmission device, that the data packet whose sequence number is M1 is an out-of-order packet.

According to the second aspect or the first possible implementation of the second aspect, in a second possible implementation of the second aspect, a data packet whose sequence number is N3 and the data packet whose sequence number is M1 are two data packets successively received, where N3 is greater than or equal to N2. The method further includes: when determining that M1 is less than N3 and does not belong to any sequence number black hole before the data packet whose sequence number is M1, determining, by the transmission device, that the data packet whose sequence number is M1 is a data packet corresponding to a downstream packet loss, where the sequence number black hole is a sequence number range bounded by sequence numbers of a pair of data packets that are successively received but whose sequence numbers are inconsecutive.

According to a third aspect, a method for implementing transmission performance detection is provided. The method includes: obtaining, by a detection apparatus, a time T3 at which the detection apparatus receives a data packet whose sequence number is K1 and that is sent by a sending device through a connection that is based on a reliable transport protocol and that is established between the sending device and a receiving device; and when determining that a target acknowledgment packet sent by the receiving device through the connection is received, obtaining, by the detection apparatus, a time T4 at which the detection apparatus receives the target acknowledgment packet, and computing a two-way latency (DRTT) between the detection apparatus and the receiving device based on T3 and T4, where the target acknowledgment packet is a first acknowledgment packet that is received by the detection apparatus and that indicates that the receiving device has received the data packet whose sequence number is K1 or a data packet following the data packet whose sequence number is K1. For example, when the reliable transport protocol is TCP or SCTP, the target acknowledgment packet may be specifically the first acknowledgment packet that is received by the detection apparatus and whose value of a latest right edge field of an acknowledgment number field or a selective acknowledgment (SACK) field included in the first acknowledgment packet is greater than or equal to K1+LenK1, where LenK1 is a payload length of the data packet whose sequence number is K1.

According to the method provided in the third aspect of the present disclosure, the detection apparatus computes the latency based on the time at which the data packet is sent and the time at which the target acknowledgment packet is received. Therefore, the detection apparatus can perform latency detection itself, so that implementation is easy and efficiency is relatively high.

According to a fourth aspect, a method for implementing transmission performance detection is provided. The method is applied to a communications system, the communications system includes a sending device, a receiving device, and a transmission device, the sending device and the receiving device transmit a packet through a connection that is based on a reliable transport protocol and that is established between the sending device and the receiving device, and the packet is transmitted by using the transmission device. The method includes: obtaining, by the transmission device, a time T3 at which the transmission device receives or sends a data packet whose sequence number is K1 and that is sent by the sending device through the connection that is based on the reliable transport protocol and that is established between the sending device and the receiving device; and when determining that a target acknowledgment packet sent by the receiving device through the connection is received, obtaining, by the transmission device, a time T4 at which the transmission device receives or sends the target acknowledgment packet, and computing DRTT between the transmission device and the receiving device based on T3 and T4, where the target acknowledgment packet is a first acknowledgment packet that is received by the transmission device and that indicates that the receiving device has received the data packet whose sequence number is K1 or a data packet following the data packet whose sequence number is K1. For example, when the reliable transport protocol is a transmission control protocol TCP or a stream control transmission protocol SCTP, the target acknowledgment packet may be specifically the first acknowledgment packet that is received by the transmission device and whose value of a latest right edge field of an acknowledgment number field or a selective acknowledgment SACK field included in the first acknowledgment packet is greater than or equal to K1+LenK1, where LenK1 is a payload length of the data packet whose sequence number is K1.

When T3 is the time at which the transmission device receives the data packet whose sequence number is K1, T4 is generally the time at which the transmission device sends the target acknowledgment packet. When T3 is the time at which the transmission device sends the data packet whose sequence number is K1, T4 is generally the time at which the transmission device receives the target acknowledgment packet.

In a possible implementation of the fourth aspect, when the receiving device is a client device and the sending device is a server, the receiving device sends a request message to the sending device to request for establishment of the connection when the connection is being established, and the sending device sends a response message to the receiving device in response to the request message. Correspondingly, the transmission device receives the request message sent by the receiving device to the sending device when the connection is being established, receives the response message sent by the sending device, and determines a difference between a time at which the request message is received or is sent and a time at which the response message is sent or is received as a two-way latency (URTT) between the sending device and the transmission device.

Specifically, the difference between the time at which the request message is received and the time at which the response message is sent may be determined as the URTT, or the difference between the time at which the request message is sent and the time at which the response message is received may be determined as the URTT.

According to a fifth aspect, a method for implementing transmission performance detection is provided. The detection method is performed by a detection device in a communications system, the communications system includes a sending device, a receiving device, and at least one transmission device, the sending device and the receiving device transmit a packet through a connection that is based on a reliable transport protocol and that is established between the sending device and the receiving device, the packet is transmitted by using the at least one transmission device, and the detection device is the sending device or one of the at least one transmission device.

The method includes: generating, by the detection device, a detection packet, and sending the detection packet through the connection, where the detection packet has an empty payload and includes a quantity Num1 of counted packets that have been sent by using the communications unit in a current detection period, and Num1 is used to determine whether one or more of the counted packets transmitted between the detection device and a downstream device of the detection device in the current detection period are lost.

According to the method provided in the fifth aspect of the present disclosure, when the packet loss detection is being performed, each device does not need to report a quantity of data packets that have been transmitted, so that implementation is easy and efficiency is relatively high.

According to a sixth aspect, a method for implementing transmission performance detection is provided. The detection method is performed by a detection device in a communications system.

The communications system includes a sending device, a receiving device, and at least one transmission device, where the sending device and the receiving device transmit a packet through a connection that is based on a reliable transport protocol and that is established between the sending device and the receiving device, the packet is transmitted by using the at least one transmission device, and the detection device is the receiving device or a transmission device that is in the at least one transmission device and that is located between a device configured to generate a detection packet and the receiving device. The detection packet has an empty payload and may include a quantity Num1, added by the device generating the detection packet, of counted packets that have been sent through the connection in the current detection period.

The method includes: after receiving the detection packet, determining, by the detection device, a quantity Num2 of counted packets that have been received through the connection in the current detection period, where Num2 is used to determine whether one or more of the counted packets transmitted between the detection device and an upstream device or a downstream device of the detection device in the current detection period are lost. When the detection packet includes Num1, the detection device may further determine, based on Num1 and Num2, whether one or more of the counted packets transmitted, in the current detection period, between the device that generates the detection packet and the detection device are lost.

According to the method provided in the sixth aspect of the present disclosure, when the packet loss detection is being performed, each device does not need to report a quantity of counted packets that have been transmitted, so that implementation is easy and efficiency is relatively high.

According to a seventh aspect, a method for implementing transmission performance detection is provided. The detection method is performed by a detection device in a communications system, the communications system includes a sending device, a receiving device, and at least one transmission device, the sending device and the receiving device transmit a packet through a connection that is based on a reliable transport protocol and that is established between the sending device and the receiving device, the packet is transmitted by using the at least one transmission device, and the detection device is the sending device or one of the at least one transmission device.

The method includes: generating, by the detection device, a detection packet, and sending the detection packet through the connection, where the detection packet has an empty payload and includes a time T1 at which the first detection device generates the detection packet, and T1 is used to compute a one-way latency between the detection device and a downstream device of the detection device.

According to the method provided in the seventh aspect of the present disclosure, when the latency detection is being performed, each device does not need to report time information used to compute the latency, so that implementation is easy and efficiency is relatively high.

According to an eighth aspect, a method for implementing transmission performance detection is provided. The detection method is performed by a detection device in a communications system.

The communications system includes a sending device, a receiving device, and at least one transmission device, where the sending device and the receiving device transmit a packet through a connection that is based on a reliable transport protocol and that is established between the sending device and the receiving device, the packet is transmitted by using the at least one transmission device, and the detection device is the receiving device or a transmission device that is in the at least one transmission device and that is located between a device configured to generate a detection packet and the receiving device. The detection packet has an empty payload and may include a time T1 that is added by the device that generates the detection packet and at which the detection packet is generated.

The method includes: after receiving the detection packet, obtaining, by the detection device, a time T2 at which the detection packet is received, where T2 is used to compute a one-way latency between the detection device and an upstream device or a downstream device of the detection device. When the detection packet includes T1, the detection device may further compute a one-way latency between a first detection device and a second detection device based on T1 and T2.

According to the method provided in the eighth aspect of the present disclosure, when the latency detection is being performed, each device does not need to report time information used to compute the latency, so that implementation is easy and efficiency is relatively high.

According to a ninth aspect, a method for implementing transmission performance detection is provided. The detection method is performed by a detection device in a communications system, the communications system includes a sending device, a receiving device, and at least one transmission device, the sending device and the receiving device transmit a packet through a connection that is based on a reliable transport protocol and that is established between the sending device and the receiving device, the packet is transmitted by using the at least one transmission device, and the detection device is the sending device or one of the at least one transmission device.

The method includes: generating, by the detection device, a detection packet, and sending the detection packet through the connection, where the detection packet has an empty payload and includes an identifier of the first detection device, and the identifier of the first detection device is used to determine a transmission path through which the detection packet passes.

According to the method provided in the ninth aspect of the present disclosure, the transmission path through which the detection packet passes can be conveniently determined, so that useful reference information can be provided for transmission performance evaluation.

According to a tenth aspect, a method for implementing transmission performance detection is provided. The detection method is performed by a detection device in a communications system.

The communications system includes a sending device, a receiving device, and at least one transmission device, where the sending device and the receiving device transmit a packet through a connection that is based on a reliable transport protocol and that is established between the sending device and the receiving device, the packet is transmitted by using the at least one transmission device, and the detection device is a transmission device that is in the at least one transmission device and that is located between a device configured to generate a detection packet and the receiving device. The detection packet has an empty payload, and may include an identifier that is added by the device configured to generate the detection packet and that is of the device configured to generate the detection packet, and the identifier of the device configured to generate the detection packet is used to determine a transmission path through which the detection packet passes.

The method includes: after receiving the detection packet, adding, by the detection device, an identifier of the detection device to the detection packet, and sending the detection packet. The identifier of the detection device is used to determine the transmission path through which the detection packet passes.

According to the method provided in the tenth aspect of the present disclosure, the transmission path through which the detection packet passes can be conveniently determined, so that useful reference information can be provided for transmission performance evaluation.

According to an eleventh aspect, a communications system for implementing transmission performance detection is provided. The communications system includes a sending device, a receiving device, and at least one transmission device, the sending device and the receiving device transmit a packet through a connection that is based on a reliable transport protocol and that is established between the sending device and the receiving device, and the packet is transmitted by using the at least one transmission device.

A first detection device in the communications system is configured to: generate a detection packet, and send the detection packet through the connection, where the detection packet has an empty payload and includes a quantity Num1 of counted packets that the first detection device has sent through the connection in a current detection period, and the first detection device is the sending device or one of the at least one transmission device.

A second detection device in the communications system is configured to: after receiving the detection packet, determine a quantity Num2 of counted packets that the second detection device has received through the connection in the current detection period, where Num1 and Num2 are used to determine whether one or more of the counted packets transmitted between the first detection device and the second detection device in the current detection period are lost, and the second detection device is the receiving device or a transmission device that is in the at least one transmission device and that is located between the first detection device and the receiving device. During specific implementation, the second detection device may be further configured to determine, based on Num1 and Num2, whether one or more of the counted packets transmitted between the first detection device and the second detection device in the current detection period are lost, and calculate, based on Num1 and Num2, a quantity of counted packet that are lost between the first detection device and the second detection device in the current detection period, and a packet loss rate between the first detection device and the second detection device, where Num1 is greater than Num2.

According to the communications system provided in the eleventh aspect of the present disclosure, when the packet loss detection is being performed, each device does not need to report a quantity of data packets that have been transmitted, so that it is easy to implement the packet loss detection and efficiency is relatively high.

According to a twelfth aspect, a communications system for implementing transmission performance detection is provided. The communications system includes a sending device, a receiving device, and at least one transmission device, the sending device and the receiving device transmit a packet through a connection that is based on a reliable transport protocol and that is established between the sending device and the receiving device, and the packet is transmitted by using the at least one transmission device.

A first detection device in the communications system is configured to: generate a detection packet, and send the detection packet through the connection, where the detection packet has an empty payload and includes a time T1 at which the first detection device generates the detection packet, and the first detection device is the sending device or one of the at least one transmission device.

A second detection device in the communications system is configured to: after receiving the detection packet, obtain a time T2 at which the detection packet is received, where T1 and T2 are used to compute a one-way latency between the first detection device and the second detection device, and the second detection device is the receiving device or a transmission device that is in the at least one transmission device and that is located between the first detection device and the receiving device.

According to the communications system provided in the twelfth aspect of the present disclosure, when the latency detection is being performed, each device does not need to report time information used to compute the latency, so that implementation is easy and efficiency is relatively high.

According to a thirteen aspect, a communications system for implementing transmission performance detection is provided. The communications system includes a sending device, a receiving device, and at least one transmission device, the sending device and the receiving device transmit a packet through a connection that is based on a reliable transport protocol and that is established between the sending device and the receiving device, and the packet is transmitted by using the at least one transmission device.

A first detection device in the communications system is configured to: generate a detection packet, and send the detection packet through the connection, where the detection packet has an empty payload and includes an identifier of the first detection device, and the first detection device is the sending device or one of the at least one transmission device.

A second detection device in the communications system is configured to: after receiving the detection packet, add an identifier of the second detection device to the detection packet, and send the detection packet, where the second detection device is a transmission device that is in the at least one transmission device and that is located between the first detection device and the receiving device.

The identifier of the first detection device and the identifier of the second detection device are used to determine a transmission path through which the detection packet passes.

According to the communications system provided in the thirteenth aspect of the present disclosure, the transmission path through which the detection packet passes can be conveniently determined, so that useful reference information can be provided for transmission performance evaluation.

According to a fourteenth aspect, a detection apparatus is provided, and the detection apparatus includes a receiving unit and a processing unit.

The receiving unit is configured to receive a packet transmitted between a sending device and a receiving device through a connection that is based on a reliable transport protocol and that is established between the sending device and the receiving device.

The processing unit is configured to: after the receiving unit successively receives data packets whose sequence numbers are N1 and N2 and that are sent by the sending device through the connection, determine that N2 is greater than N1 and that N1 and N2 are inconsecutive; and after the receiving unit successively receives the data packet whose sequence number is N2 and a data packet whose sequence number is M1, when determining that M1 is greater than N1 and is less than N2 and that T2 T1 is greater than or equal to an RTT, determine that the data packet whose sequence number is M1 is a retransmitted packet corresponding to an upstream packet loss, where T1 is a time at which the receiving unit receives the data packet whose sequence number is N2, T2 is a time at which the receiving unit receives the data packet whose sequence number is M1, the RTT is a two-way latency between the sending device and the receiving device, and the upstream packet loss is a packet loss occurring between the sending device and the detection apparatus.

According to a fifteenth aspect, a detection apparatus is provided, and the detection apparatus includes a receiving unit and a processing unit.

The receiving unit is configured to receive a packet transmitted between a sending device and a receiving device through a connection that is based on a reliable transport protocol and that is established between the sending device and the receiving device, where the reliable transport protocol is a transmission control protocol TCP or a stream control transmission protocol SCTP.

The processing unit is configured to: obtain a time T3 at which the receiving unit receives a data packet whose sequence number is K1 and that is sent by the sending device through the connection; when determining that the receiving unit receives a target acknowledgment packet sent by the receiving device through the connection, obtain a time T4 at which the receiving unit receives the target acknowledgment packet; and compute DRTT between the detection apparatus and the receiving device based on T3 and T4, where the target acknowledgment packet is a first acknowledgment packet that is received by the receiving unit and that indicates that the receiving device has received the data packet whose sequence number is K1 or a data packet following the data packet whose sequence number is K1. For example, the reliable transport protocol is a transmission control protocol TCP or a stream control transmission protocol SCTP, and correspondingly, the target acknowledgment packet may be specifically the first acknowledgment packet that is received by the receiving unit and whose value of a latest right edge field of an acknowledgment number field or a selective acknowledgment SACK field included in the first acknowledgment packet is greater than or equal to K1+LenK1, where LenK1 is a payload length of the data packet whose sequence number is K1.

According to a sixteenth aspect, a transmission device is provided, and the transmission device includes a communications unit and the detection apparatus according to the thirteenth aspect. The communications unit is configured to: transmit information transmitted between a sending device and a receiving device, and send the information to the detection apparatus, where the information includes a packet transmitted through a connection and/or a message used to establish the connection.

According to a seventeenth aspect, a transmission device is provided. The transmission device is applied to a communications system, the communications system includes a sending device, a receiving device, and the transmission device, the sending device and the receiving device transmit a packet through a connection that is based on a reliable transport protocol and that is established between the sending device and the receiving device, and the packet is transmitted by using the transmission device.

The transmission device includes a communications unit and a processing unit.

The communications unit is configured to transmit a packet transmitted between the sending device and the receiving device through the connection.

The processing unit is configured to: after the communications unit successively receives data packets whose sequence numbers are N1 and N2 and that are sent by the sending device through the connection, determine that N2 is greater than N1 and that N1 and N2 are inconsecutive; and after the communications unit successively receives the data packet whose sequence number is N2 and a data packet whose sequence number is M1, when determining that M1 is greater than N1 and is less than N2 and that T2 T1 is greater than or equal to an RTT, determine that the data packet whose sequence number is M1 is a retransmitted packet corresponding to an upstream packet loss, where T1 is a time at which the communications unit receives or sends the data packet whose sequence number is N2, T2 is a time at which the communications unit receives or sends the data packet whose sequence number is M1, the RTT is a two-way latency between the sending device and the receiving device, and the upstream packet loss is a packet loss occurring between the sending device and the transmission device.

In a first possible implementation of the seventeenth aspect, the processing unit is further configured to: when determining that M1 is greater than N1 and that T2−T1 is less than the RTT, determine that the data packet whose sequence number is M1 is an out-of-order packet.

According to the seventeenth aspect or the first possible implementation of the seventeenth aspect, in a second possible implementation of the seventeenth aspect, a data packet whose sequence number is N3 and the data packet whose sequence number is M1 are two data packets successively received, where N3 is greater than or equal to N2. The processing unit is further configured to: when determining that M1 is less than N3 and does not belong to any sequence number black hole before the data packet whose sequence number is M1, determine that the data packet whose sequence number is M1 is a data packet corresponding to a downstream packet loss, where the sequence number black hole is a sequence number range bounded by sequence numbers of a pair of data packets that are successively received but whose sequence numbers are inconsecutive.

According to an eighteenth aspect, a transmission device is provided. The transmission device is applied to a communications system, the communications system includes a sending device, a receiving device, and the transmission device, the sending device and the receiving device transmit a packet through a connection that is based on a reliable transport protocol and that is established between the sending device and the receiving device, and the packet is transmitted by using the transmission device.

The transmission device includes a communications unit and a processing unit.

The communications unit is configured to transmit a packet transmitted between the sending device and the receiving device through the connection.

The processing unit is configured to: obtain a time T3 at which the communications unit receives a data packet whose sequence number is K1 and that is sent by the sending device through the connection; when determining that the communications unit receives a target acknowledgment packet sent by the receiving device through the connection, obtain a time T4 at which the communications unit receives or sends the target acknowledgment packet; and compute DRTT between a detection apparatus and the receiving device based on T3 and T4, where the target acknowledgment packet is a first acknowledgment packet that is received by the communications unit to and that indicates that the receiving device has received the data packet whose sequence number is K1 or a data packet following the data packet whose sequence number is K1. For example, when the reliable transport protocol is a transmission control protocol TCP or a stream control transmission protocol SCTP, the target acknowledgment packet may be specifically the first acknowledgment packet that is received by the transmission device and whose value of a latest right edge field of an acknowledgment number field or a selective acknowledgment SACK field included in the first acknowledgment packet is greater than or equal to K1+LenK1, where LenK1 is a payload length of the data packet whose sequence number is K1.

In a possible implementation of the eighteenth aspect, when the receiving device is a client device and the sending device is a server, the receiving device sends a request message to the sending device to request for establishment of the connection when the connection is being established, and the sending device sends a response message to the receiving device in response to the request message. Correspondingly, the communications unit is further configured to receive the request message that is sent by the receiving device to the sending device to request for establishment of the connection when the connection is being established, and the response message sent by the sending device to the receiving device in response to the request message; and the processing unit is further configured to determine a difference between a time at which the communications unit receives or sends the request message and a time at which the response message is sent or received as URTT between the sending device and the transmission device.

During specific implementation, the processing unit may determine the difference between the time at which the communications unit receives the request message and the time at which the communications unit sends the response message as the URTT, or may determine the difference between the time at which the communications unit sends the request message and the time at which the communications unit receives the response message as the URTT.

According to a nineteenth aspect, a detection device is provided. The detection device is applied to a communications system, the communications system includes a sending device, a receiving device, and at least one transmission device, the sending device and the receiving device transmit a packet through a connection that is based on a reliable transport protocol and that is established between the sending device and the receiving device, the packet is transmitted by using the at least one transmission device, and the detection device is the sending device or one of the at least one transmission device.

The detection device includes a communications unit and a processing unit. The communications unit is configured to transmit the packet through the connection. The processing unit is configured to: generate a detection packet, and send the detection packet by using the communications unit, where the detection packet has an empty payload and includes a quantity Num1 of counted packets that have been sent by using the communications unit in a current detection period, and Num1 is used to determine whether one or more of the counted packets transmitted between the detection device and a downstream device of the detection device in the current detection period are lost.

According to a twentieth aspect, a detection device is provided. The detection device is applied to a communications system, the communications system includes a sending device, a receiving device, and at least one transmission device, the sending device and the receiving device transmit a packet through a connection that is based on a reliable transport protocol and that is established between the sending device and the receiving device, the packet is transmitted by using the at least one transmission device, the detection device is the receiving device or a transmission device that is in the at least one transmission device and that is located between a device configured to generate a detection packet and the receiving device, and the detection packet has an empty payload.

The detection device includes a communications unit and a processing unit.

The communications unit is configured to transmit a packet through the connection.

The processing unit is configured to: after receiving the detection packet, determine a quantity Num2 of counted packets that the communications unit has received through the connection in a current detection period, where Num2 is used to determine whether one or more of the counted packets transmitted between the detection device and an upstream device or a downstream device of the detection device in the current detection period are lost.

According to a twenty-first aspect, a detection device is provided. The detection device is applied to a communications system, the communications system includes a sending device, a receiving device, and at least one transmission device, the sending device and the receiving device transmit a packet through a connection that is based on a reliable transport protocol and that is established between the sending device and the receiving device, the packet is transmitted by using the at least one transmission device, and the detection device is the sending device or one of the at least one transmission device.

The detection device includes a communications unit and a processing unit. The communications unit is configured to transmit the packet through the connection. The processing unit is configured to generate a detection packet, and send the detection packet by using the communications unit, where the detection packet has an empty payload and includes a time T1 at which a first detection device generates the detection packet, and T1 is used to compute a one-way latency between the detection device and a downstream device of the detection device.

According to a twenty-second aspect, a detection device is provided. The detection device is applied to a communications system, the communications system includes a sending device, a receiving device, and at least one transmission device, the sending device and the receiving device transmit a packet through a connection that is based on a reliable transport protocol and that is established between the sending device and the receiving device, the packet is transmitted by using the at least one transmission device, and the detection device is the receiving device or a transmission device that is in the at least one transmission device and that is located between a device configured to generate a detection packet and the receiving device. The detection packet has an empty payload and may include a time T1 that is added by the device that generates the detection packet and at which the detection packet is generated.

The detection device includes a communications unit and a processing unit. The communications unit is configured to transmit the packet through the connection. The processing unit is configured to: after receiving the detection packet, obtain a time T2 at which the detection packet is received, where T2 is used to compute a one-way latency between the detection device and an upstream device or a downstream device of the detection device. When the detection packet includes T1, the detection device may further compute a one-way latency between a first detection device and a second detection device based on T1 and T2.

According to a twenty-third aspect, a detection device is provided. The detection device is applied to a communications system, the communications system includes a sending device, a receiving device, and at least one transmission device, the sending device and the receiving device transmit a packet through a connection that is based on a reliable transport protocol and that is established between the sending device and the receiving device, the packet is transmitted by using the at least one transmission device, and the detection device is the sending device or one of the at least one transmission device.

The detection device includes a communications unit and a processing unit. The communications unit is configured to transmit the packet through the connection. The processing unit is configured to generate a detection packet, and send the detection packet by using the communications unit, where the detection packet has an empty payload and includes an identifier of the first detection device, and the identifier of the first detection device is used to determine a transmission path through which the detection packet passes.

According to a twenty-fourth aspect, a detection device is provided. The detection device is applied to a communications system, the communications system includes a sending device, a receiving device, and at least one transmission device, the sending device and the receiving device transmit a packet through a connection that is based on a reliable transport protocol and that is established between the sending device and the receiving device, the packet is transmitted by using the at least one transmission device, and the detection device is a transmission device that is in the at least one transmission device and that is located between a device configured to generate a detection packet and the receiving device. The detection packet has an empty payload, and may include an identifier that is added by the device configured to generate the detection packet and that is of the device configured to generate the detection packet, and the identifier of the device configured to generate the detection packet is used to determine a transmission path through which the detection packet passes.

The detection device includes a communications unit and a processing unit. The communications unit is configured to transmit the packet through the connection. The processing unit is configured to: after receiving the detection packet, add an identifier of the detection device to the detection packet, and send the detection packet.

According to a twenty-fifth aspect, a detection apparatus is provided, and the detection apparatus includes a transceiver, a processor, and a memory.

The transceiver is configured to: receive information transmitted between a sending device and a receiving device, and send the information to the processor, where the information includes a packet transmitted through a connection that is based on a reliable transport protocol and that is established between the sending device and the receiving device and/or a message used to establish the connection. The transceiver may be specifically a network adapter.

The memory is configured to store a computer operation instruction.

The processor is configured to execute the computer operation instruction stored in the memory, so as to enable the detection apparatus to perform the method provided in the first aspect or the second aspect of the present disclosure.

According to a twenty-sixth aspect, a transmission device is provided. The transmission device includes a transceiver, a processor, and the detection apparatus provided in the twenty-first aspect of the present disclosure.

The transceiver is configured to: receive information transmitted between a sending device and a receiving device, and send the information to the processor, where the information includes a packet transmitted through a connection that is based on a reliable transport protocol and that is established between the sending device and the receiving device and/or a message used to establish the connection. The transceiver may be specifically a network adapter.

The processor is configured to transmit the information to the detection apparatus.

According to a twenty-seventh aspect, a transmission device is provided. The transmission device includes a transceiver, a processor, and a memory.

The transceiver is configured to: receive information transmitted between a sending device and a receiving device, and send the information to the processor, where the information includes a packet transmitted through a connection that is based on a reliable transport protocol and that is established between the sending device and the receiving device and/or a message used to establish the connection. The transceiver may be specifically a network adapter.

The memory is configured to store a computer operation instruction.

The processor is configured to execute the computer operation instruction stored in the memory, so as to enable the transmission device to perform the method provided in the first aspect or the second aspect of the present disclosure.

According to a twenty-eighth aspect, a detection device is provided. The detection device is applied to a communications system, the communications system includes a sending device, a receiving device, and at least one transmission device, the sending device and the receiving device transmit a packet through a connection that is based on a reliable transport protocol and that is established between the sending device and the receiving device, the packet is transmitted by using the at least one transmission device, and the detection device is the sending device or one of the at least one transmission device.

The detection device includes a transceiver, a processor, and a memory.

The memory is configured to store a computer operation instruction.

The processor is configured to execute the computer operation instruction stored in the memory, so as to enable the transmission device to perform the method provided in any one of the third aspect, the fifth aspect, or the seventh aspect of the present disclosure. Specifically, the processor receives and sends the packet by using the transceiver.

According to a twenty-ninth aspect, a detection device is provided. The detection device is applied to a communications system, the communications system includes a sending device, a receiving device, and at least one transmission device, the sending device and the receiving device transmit a packet through a connection that is based on a reliable transport protocol and that is established between the sending device and the receiving device, the packet is transmitted by using the at least one transmission device, the detection device is the receiving device or a transmission device that is in the at least one transmission device and that is located between a device configured to generate a detection packet and the receiving device, and the detection packet has an empty payload.

The detection device includes a transceiver, a processor, and a memory.

The memory is configured to store a computer operation instruction.

The processor is configured to execute the computer operation instruction stored in the memory, so as to enable the transmission device to perform the method provided in any one of the fourth aspect, the sixth aspect, or the eighth aspect of the present disclosure. Specifically, the processor receives and sends the packet by using the transceiver.

According to a thirtieth aspect, a computer readable storage medium is provided. The computer readable storage medium stores an instruction, and when the instruction is run on a computer, the computer is enabled to perform the method in the foregoing aspects.

According to a thirty-first aspect, a computer program product that includes an instruction is provided. When the computer program product is run on a computer, the computer is enabled to perform the method in the foregoing aspects.

BRIEF DESCRIPTION OF DRAWINGS

To describe the technical solutions in embodiments of the present disclosure more clearly, the following briefly describes the accompanying drawings.

DESCRIPTION OF EMBODIMENTS

The following describes embodiments of the present disclosure with reference to the accompanying drawings.

Figure 1A:
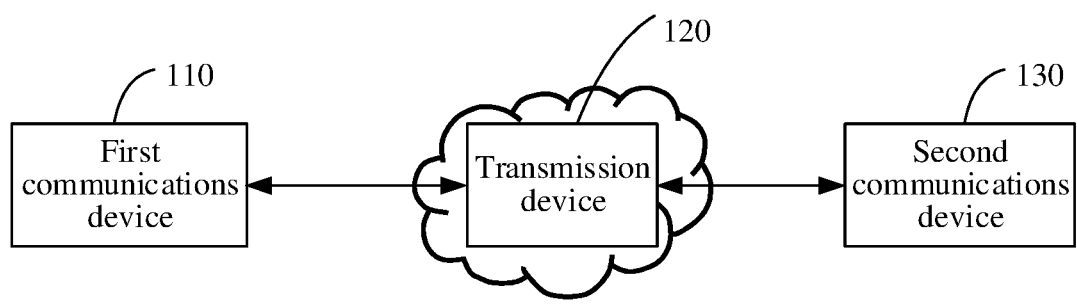
FIG. 1A and FIG. 1B are schematic diagrams of a networking structure of a communications system 100 according to an embodiment of the present disclosure.

FIG. 1A is a schematic diagram of a networking structure of a communications system 100 according to an embodiment of the present disclosure. The communications system 100 includes a first communications device 110, at least one transmission device 120, and a second communications device 130. A connection based on a reliable transport protocol may be established between the first communications device 110 and the second communications device 130, packets are transmitted through the connection, and then the packets transmitted through the connection are transmitted by using the at least one transmission device 120. The reliable transport protocol may be specifically a TCP, an SCTP, or the like.

The packets include a data packet and an acknowledgment packet used to acknowledge the data packet, such as an ACK packet. The data packet is typically a packet that carries communication data. It should be noted that an acknowledgment packet sent by one of the first communications device 110 and the second communications device 130 (which is referred to as a communications device A below) to the other communications device (which is referred to as a communications device B) through the connection may also carry data. In this case, the acknowledgment packet is used as not only the acknowledgment packet sent by the communications device A to the communications device B but also a data packet sent by the communications device B to the communications device A. For any data packet sent by the communications device A to the communications device B, the communications device B usually notifies, by using the acknowledgment packet, the communications device A whether the data packet has been received, and if the data packet is lost, the communications device A usually retransmits the data packet.

A sequence number of a data packet sent by the communications device A to the communications device B through the connection complies with a specific rule. For example, when the reliable transport protocol is the TCP or the SCTP, for any two adjacent data packets, a sequence number of the later data packet is equal to a sequence number of the former data packet plus a payload length of the previous data packet.

It should be noted that the communications device A may alternatively send, to the communications device B through the connection, a packet that does not carry communication data, and a payload length of the packet that does not carry the communication data is 0. When the reliable transport protocol is the TCP or the SCTP, for any two packets, a sequence number of the later packet (which may be a data packet, or may be a packet that does not carry the communication data) is equal to a sequence number of the former packet (which may be a data packet, or may be a packet that does not carry the communication data) plus a payload length of the former packet. Because the payload length of the packet that does not carry the communication data is 0, when the communications device A sends, through the connection, the data packet and the packet that does not carry the communication data to the communications device B, for any two adjacent data packets, a rule that a sequence number of the later data packet is equal to a sequence number of the former data packet plus a payload length of the former data packet is complied with.

For any packet that does not carry the communication data and that is sent by the communications device A to the communications device B, the communications device B does not usually notify, by using an acknowledgment packet, the communications device A whether the packet has been received, and if the packet is lost, the communications device A does not usually retransmit the packet.

Both the first communications device 110 and the second communications device 130 may be terminals or servers. For example, the first communications device is a video terminal, such as a set-top box (STB), and the second communications device is a video server, such as an Internet Protocol television (IPTV) headend. For another example, both the first communications device and the second communications device are call terminals.

The transmission devices 120 may specifically include devices such as a home gateway, a core router (CR), a broadband network gateway (BNG), an optical line terminal (OLT), and a broadband remote access server (BRAS).

A data packet (such as a packet in which video data is encapsulated) sent by one of the first communications device 110 and the second communications device 130 (which is referred to as a sending device below) is transmitted by using the transmission device 120 to the other communications device (which is referred to as a receiving device below), and an acknowledgment packet that is sent by the receiving device and that is used to acknowledge a received data packet is transmitted by using the transmission device 120 to the first communications device 110.

Figure 1B:
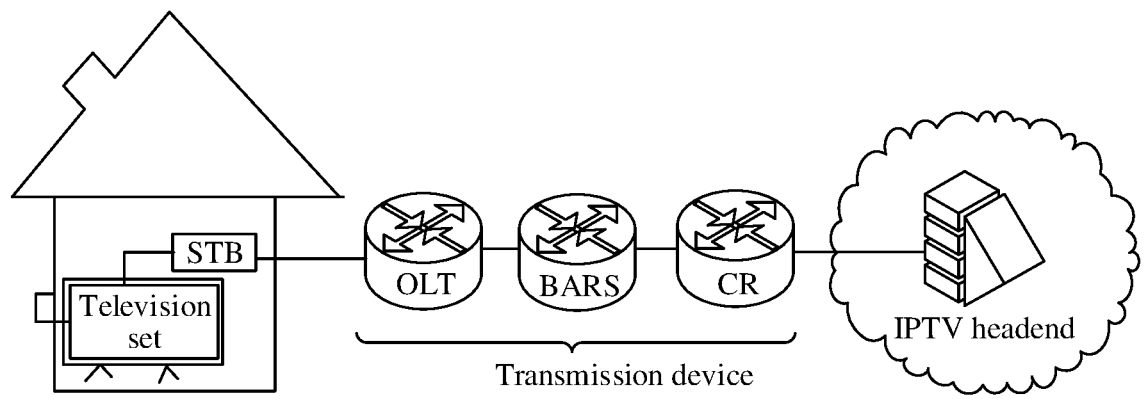

During specific implementation, the communications system 100 may be specifically an IPTV system as shown in FIG. 1B. In the IPTV system, the sending device (for example, the first communications device 110) may be specifically an IPTV headend, and the receiving device may be specifically a set top box.

Figure 2A:
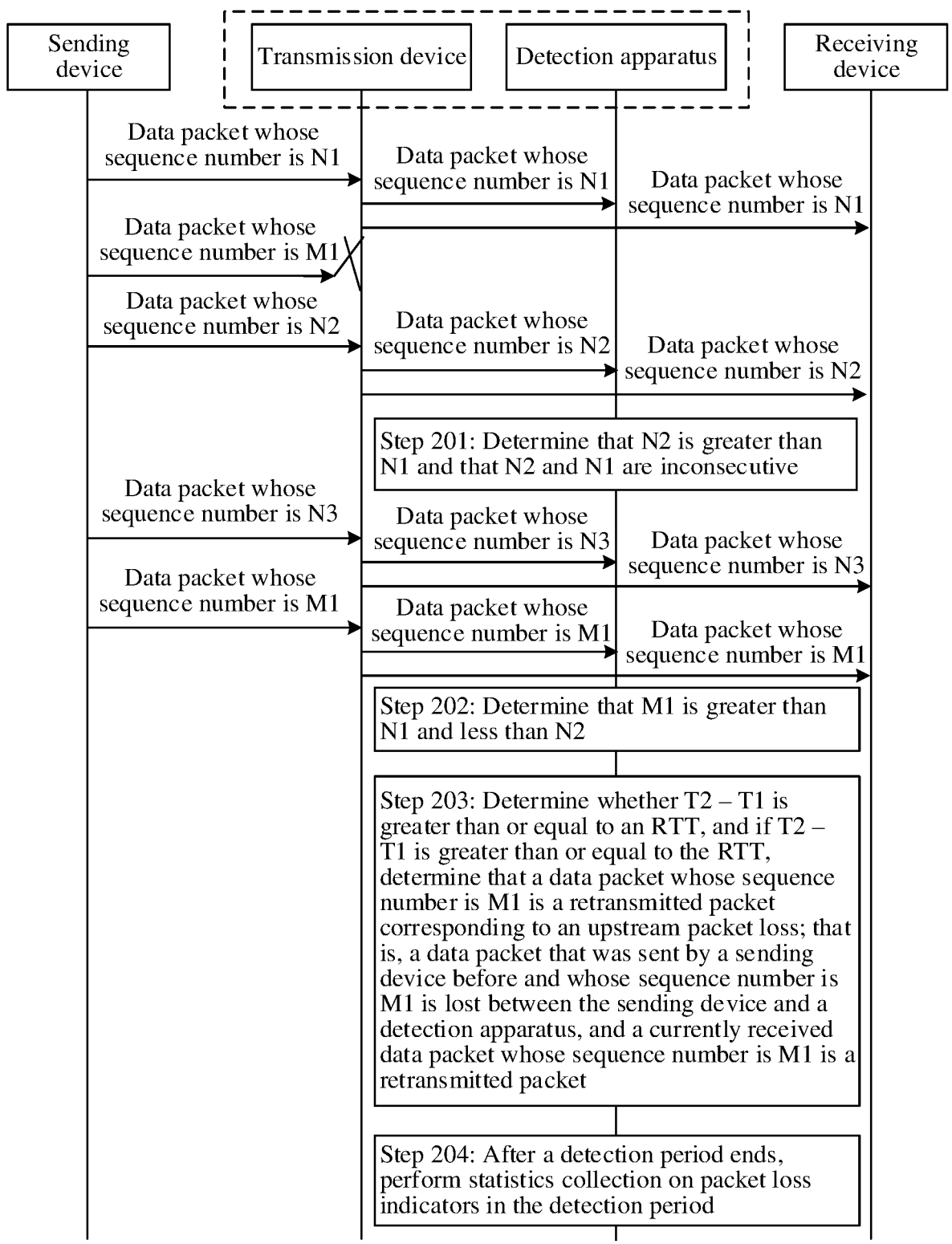
FIG. 2A and FIG. 2B are schematic flowcharts of a method according to Embodiment 1 of the present disclosure.
Figure 2B:
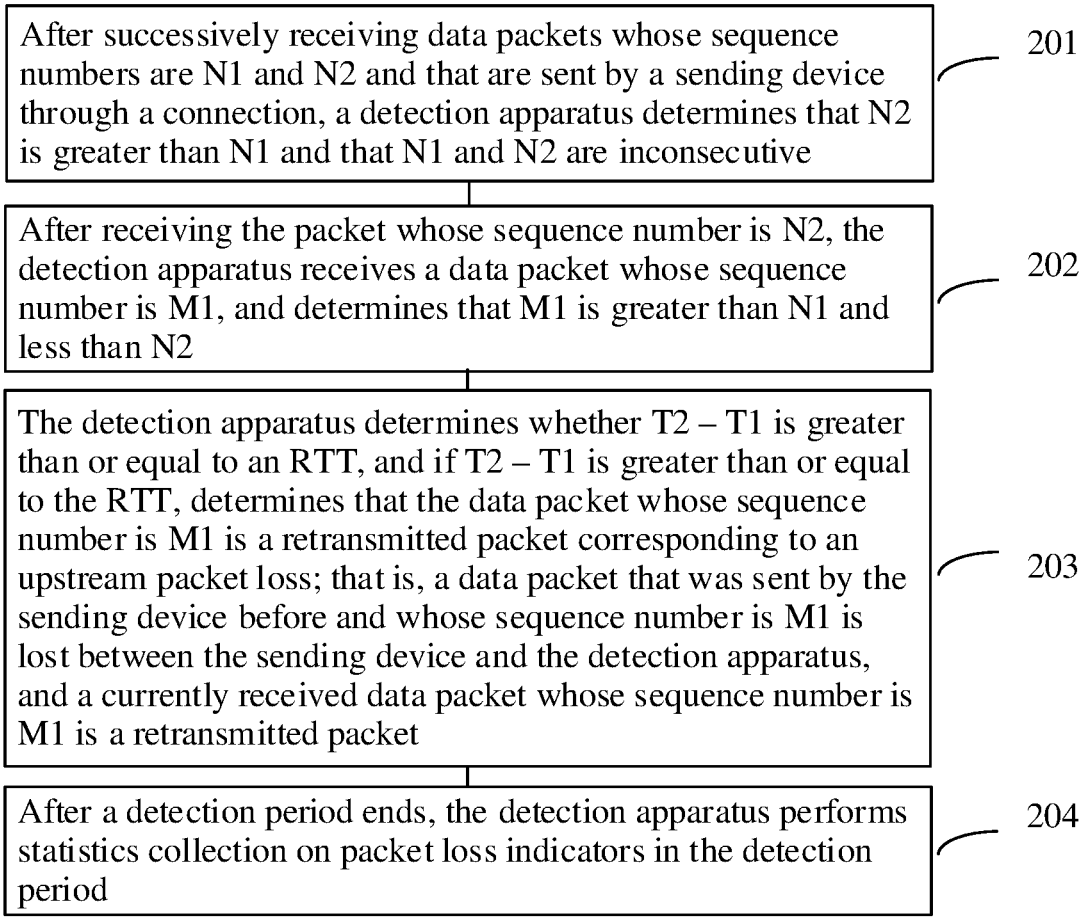
Figure 3A:
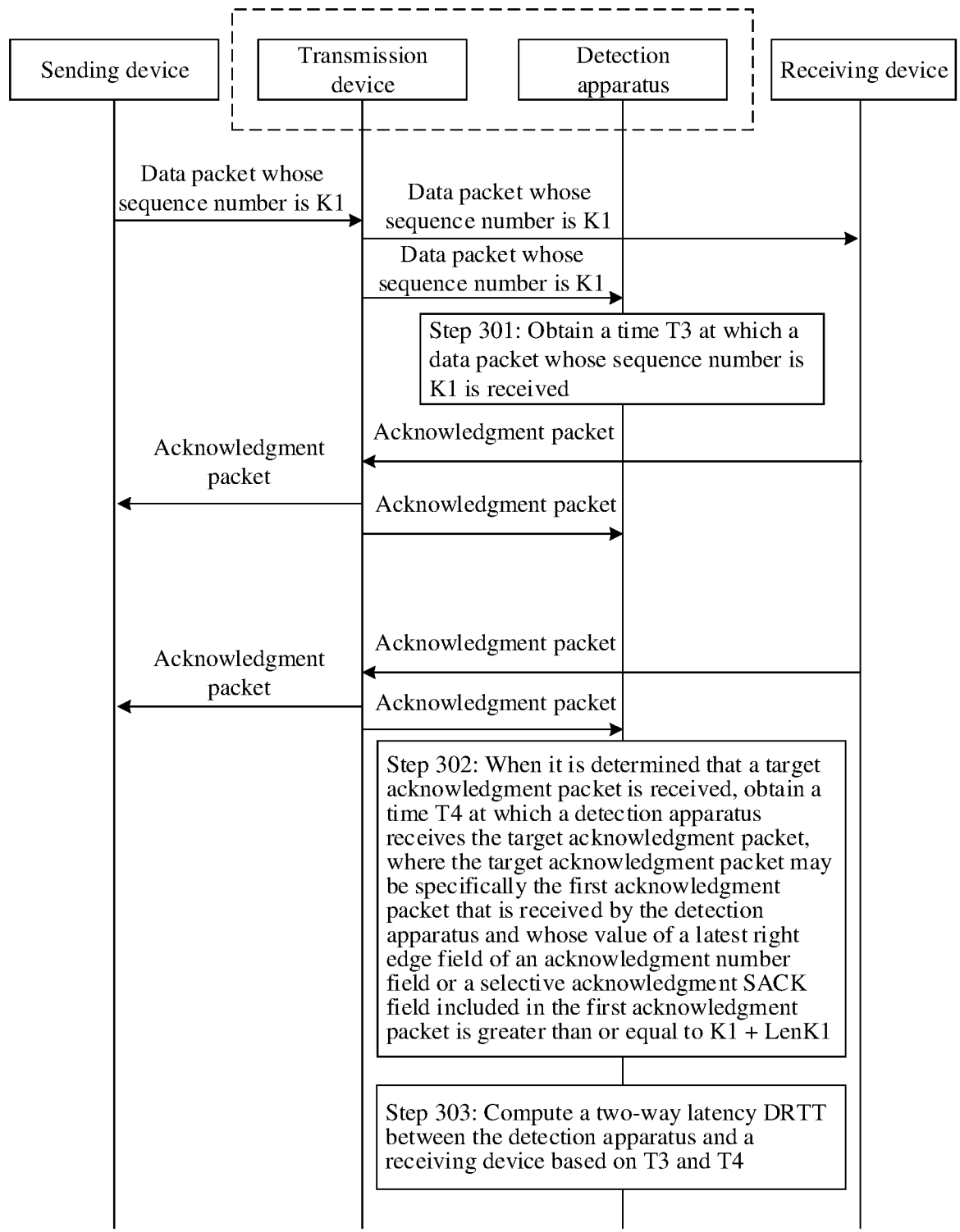
FIG. 3A and FIG. 3B are schematic flowcharts of a method according to Embodiment 2 of the present disclosure.
Figure 3B:
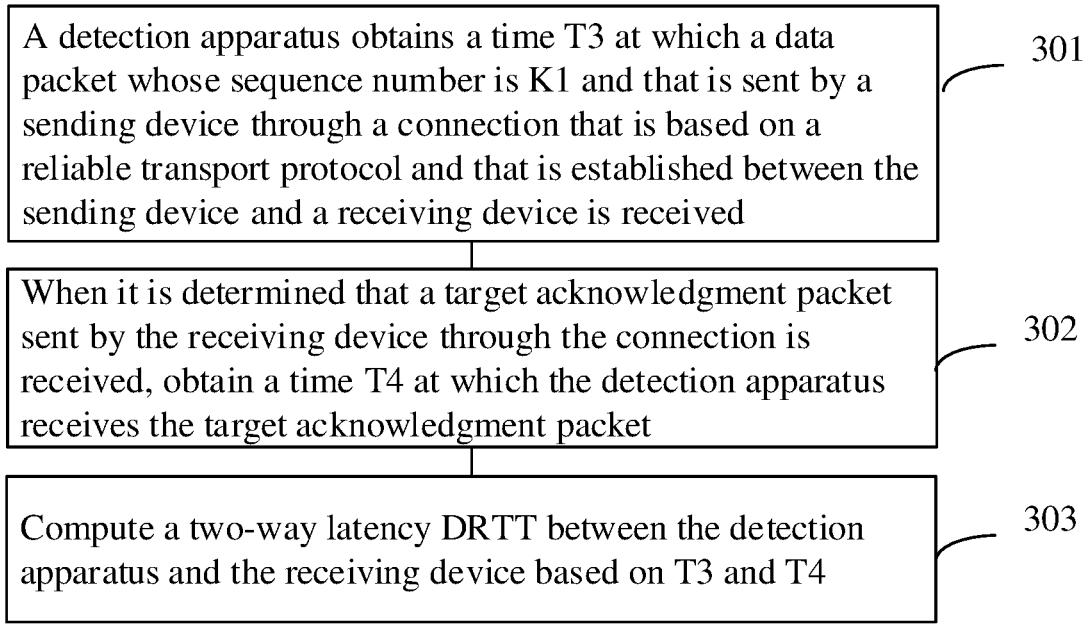
Figure 4:
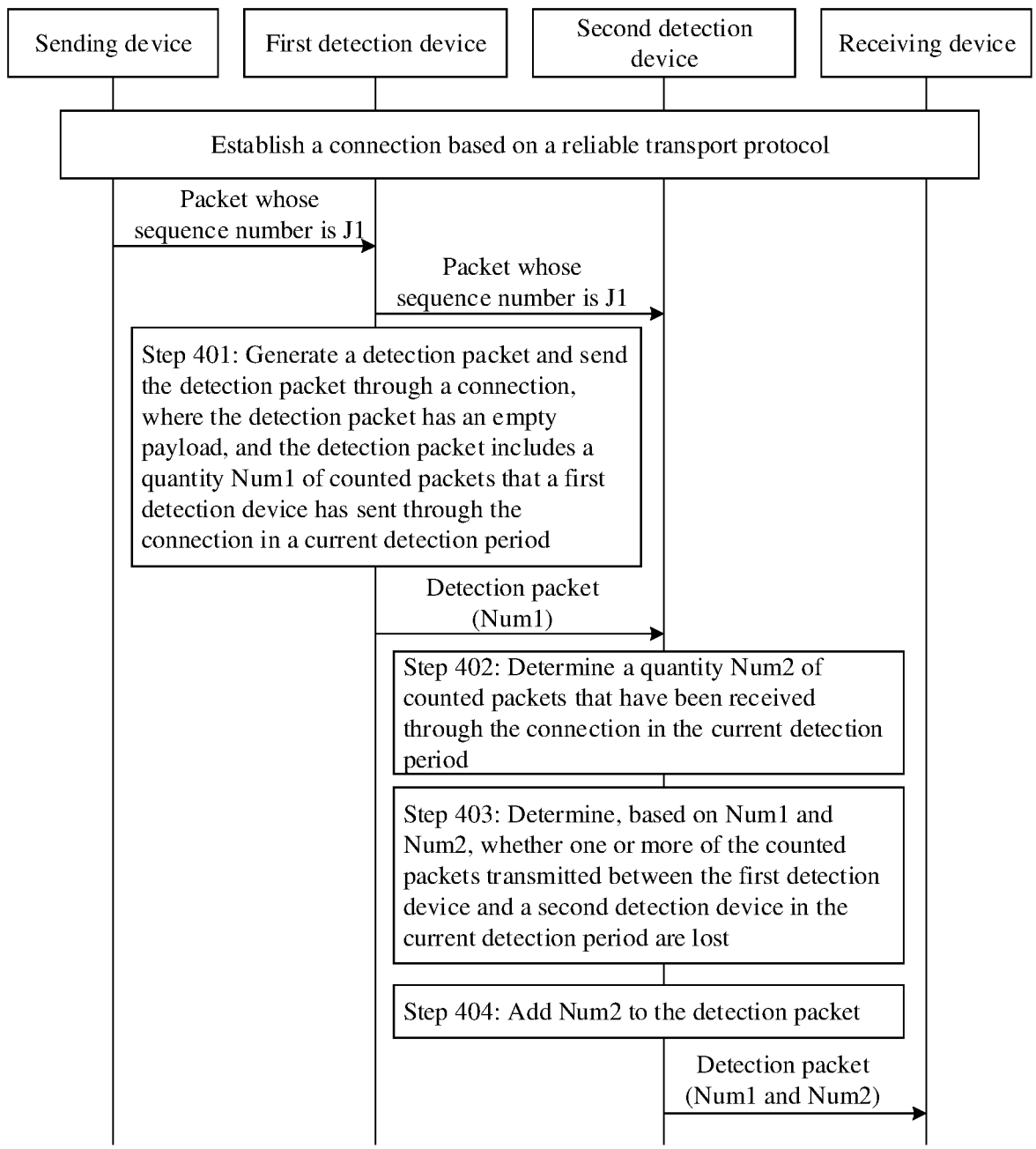
FIG. 4 is a schematic flowchart of a method according to Embodiment 3 of the present disclosure.

The following describes Embodiments 1 to 3 of the present disclosure with reference to FIG. 2A/FIG. 2B, FIG. 3A/FIG. 3B, and FIG. 4 respectively. The methods in the Embodiments 1 to 3 of the present disclosure may be applied to the communications system 100 shown in FIG. 1A and FIG. 1B.

In Embodiments 1 to 3 of the present disclosure, the connection is established between the first communications device and the second communications device based on the reliable transport protocol (such as TCP), and the packet is transmitted through the connection.

During specific implementation, one of the first communications device and the second communications device may send a data packet to the other communications device, or the first communications device and the second communications device each send a data packet to the other communications device.

Subsequently, one of the first communications device and the second communications device that sends the data packet is referred to as a sending device, and the other communications device is referred to as a receiving device.

For example, the first communications device is an STB, the second communications device is an IPTV headend, the IPTV headend sends a video stream to the STB, the IPTV headend is referred to as the sending device, and the STB is referred to as the receiving device.

For another example, both the first communications device and the second communications device are call devices and can send the data packet to each other. When transmission performance detection is being performed based on the data packet sent by the first communications device to the second communications device, the first communications device is referred to as the sending device, and the second communications device is referred to as the receiving device. Alternatively, when the transmission performance detection is being performed based on the data packet sent by the second communications device to the first communications device, the second communications device is referred to as the sending device, and the first communications device is referred to as the receiving device.

In Embodiment 1 and Embodiment 2 of the present disclosure, a detection apparatus configured to implement the transmission performance detection may be deployed in the communications system, and the detection apparatus may be implemented by using software, hardware, firmware, or any combination thereof.

The detection apparatus may be built into a transmission device in the communications system, and correspondingly, the detection apparatus receives a packet by using the transmission device into which the detection apparatus is built. If the detection apparatus is implemented by using hardware, a processor of the device into which the detection apparatus is built may send a received packet to the detection apparatus in a mirroring manner.

The detection apparatus may alternatively be deployed in a bypass mode on any device of the communications system and may obtain, in the mirroring manner, a packet transmitted by the device on which the detection apparatus is deployed in the bypass mode.

The detection apparatus may obtain, in the foregoing manner, the packet transmitted between the first communications device and the second communications device through the connection, and perform the transmission performance detection based on the obtained packet.

It should be noted that, in Embodiment 1 and Embodiment 2 of the present disclosure, a packet loss occurring between the sending device and the detection apparatus may be used to indicate a packet loss occurring between the sending device and the device into which the detection apparatus is built or the device on which the detection apparatus is deployed in the bypass mode, and a latency between the sending device and the detection apparatus may be used to indicate a latency between the sending device and the device into which the detection apparatus is built or the device on which the detection apparatus is deployed in the bypass mode. Similarly, in Embodiment 1 and Embodiment 2 of the present disclosure, a packet loss occurring between the detection apparatus and the receiving device may be used to indicate a packet loss occurring between the device into which the detection apparatus is built or the device on which the detection apparatus is deployed in the bypass mode and the receiving device. In the embodiments of the present disclosure, a latency between the detection apparatus and the receiving device may be used to indicate a latency between the device into which the detection apparatus is built or the device on which the detection apparatus is deployed in the bypass mode and the receiving device.

In addition, the detection device described in Embodiment 3, Embodiments 7 and 8, and Embodiments 12 and 13 below may be any device in the communications system, such as the sending device, the transmission device, or the receiving device.

For ease of subsequent description, terms in the embodiments of the present disclosure are first explained before the embodiments of the present disclosure are described in detail.

An upstream packet loss is a packet loss occurring between the sending device and the detection apparatus, and may be specifically used to indicate the packet loss occurring between the sending device and the device into which the detection apparatus is built, or the packet loss occurring between the sending device and the device on which the detection apparatus is deployed in the bypass mode.

A downstream packet loss is a packet loss occurring between the detection apparatus and the receiving device, and may be specifically used to indicate the packet loss occurring between the device into which the detection apparatus is built and the receiving device, or the packet loss occurring between the device on which the detection apparatus is deployed in the bypass mode and the receiving device.

FIG. 2A and FIG. 2B are schematic flowcharts of a method according to Embodiment 1 of the present disclosure Packet loss detection can be implemented by using the method. In Embodiment 1 of the present disclosure, a detection apparatus may be built into or deployed in a bypass mode on any transmission device in the communications system 100. As shown in FIG. 2A and FIG. 2B, the method provided in Embodiment 1 of the present disclosure includes the following steps.

It should be noted that FIG. 2A shows merely an example in which the detection apparatus is deployed in the bypass mode on the transmission device for illustration, and a step of sending, by the transmission device on which the detection apparatus is deployed in the bypass mode, a received packet to the detection apparatus in a mirroring way and a step of sending the received packet to the receiving device are not performed in a specific order.

Step 201: After successively receiving data packets whose sequence numbers are N1 and N2 and that are sent by a sending device through a connection, the detection apparatus determines that N2 is greater than N1 and that N1 and N2 are inconsecutive.

In this embodiment of the present disclosure, if N1 and N2 are sequence numbers of two adjacent data packets, N1 and N2 are considered consecutive, or if N1 and N2 are sequence numbers of two non-adjacent data packets, N1 and N2 are considered inconsecutive.

If the reliable transport protocol is a TCP or an SCTP, when N1 and N2 are consecutive, N2 is equal to N1+LenN1, where LenN1 is a payload length of the data packet whose sequence number is N1. Correspondingly, if N2 is greater than N1+LenN1, N1 and N2 are considered inconsecutive, that is, the data packet whose sequence number is N1 and the data packet whose sequence number is N2 are not adjacent.

It should be noted that the sending device may further send, through the connection, a packet that does not carry communication data, such as a control packet. In Embodiment 1 and Embodiment 2 of the present disclosure, the detection apparatus may further identify a data packet. When the reliable transport protocol is the TCP or the SCTP, a payload length of the packet that does not carry the communication data is 0, and specifically, the detection apparatus may identify the data packet based on a payload length of a received packet.

For ease of description, when an example is used for description, it is assumed that a payload length of each data packet is 1000.

For example, if the detection apparatus has first received a data packet whose sequence number is 2001 and whose payload length is 1000, a sequence number of a next data packet that is expected to be received at present is 3001 (that is, 2001+1000). If a data packet whose sequence number is 5001 is received at present, the data packet whose sequence number is 3001 and a data packet whose sequence number is 4001 are not received before the data packet whose sequence number is 5001 is received. Such a case in which sequence numbers of two data packets successively received are inconsecutive may be referred to as a sequence number black hole phenomenon, for example, the sequence numbers of the two data packets successively received are 2001 and 5001. A sequence number range that is bounded by sequence numbers of a pair of data packets that are successively received but whose sequence numbers are inconsecutive is referred to as a sequence number black hole. For example, a sequence number range bounded by 2001 and 5001 is (2001, 5001), where the sequence number range is an open interval and does not include boundary values. Correspondingly, a data packet whose sequence number is located between the sequence numbers of the two data packets successively received, for example, data packets whose sequence numbers are 3001 and 4001, can be referred to as a black hole packet. The black hole packet may be an out-of-order packet or a retransmitted packet.

By performing step 201, the detection apparatus detects a sequence number black hole between the sequence number N1 and the sequence number N2 (that is, a sequence number black hole bounded by N1 and N2).

Step 202: After receiving the data packet whose sequence number is N2, the detection apparatus receives a data packet whose sequence number is M1, and determines whether M1 is greater than N1 and less than N2, that is, determines whether M1 belongs to the sequence number black hole bounded by N1 and N2.

If it is determined that M1 is greater than N1 and less than N2, that is, if it is determined that the sequence number M1 belongs to the sequence number black hole bounded by N1 and N2, the data packet whose sequence number is M1 may be an out-of-order packet, or may be a retransmitted packet corresponding to an upstream packet loss.

For example, in step 201, the sequence numbers of two data packets successively received are 2001 and 5001 (that is, N1 is 2001, and N2 is 5001), and in step 202, the data packet whose sequence number is 3001 (that is, M1 is 3001) is received. In this case, the sequence number 3001 belongs to the sequence number black hole bounded by 2001 and 5001.

It is assumed that a sequence number of a latest data packet received before the data packet whose sequence number is M1 is received is N3, that is, the data packet whose sequence number is N3 and the data packet whose sequence number is M1 are successively received, and N3 is greater than or equal to N2. If M1 is less than N3, it may be preliminarily determined that the data packet whose sequence number is M1 is an out-of-order packet or a retransmitted packet.

Further, if it is determined that M1 is greater than N1 and less than N2, that is, if it is determined that the sequence number M1 belongs to the sequence number black hole bounded by N1 and N2, the data packet whose sequence number is M1 may be an out-of-order packet or the retransmitted packet corresponding to the upstream packet loss. If M1 does not belong to any sequence number black hole before the data packet whose sequence number is M1, that is, if M1 is not between N1 and N2 and does not fall into another sequence number black hole, it may be determined that the data packet whose sequence number is M1 is a retransmitted packet corresponding to a downstream packet loss. In other words, the data packet that was sent by the sending device before and whose sequence number is M1 is lost between the detection apparatus and the receiving device, and a currently received data packet whose sequence number is M1 is the retransmitted packet. When it is determined that the data packet whose sequence number is M1 is the retransmitted packet corresponding to the downstream packet loss, a quantity of lost downstream packets may be added by one, or a quantity of all lost packets may be added by one.

It should be noted that N3 may be equal to N2, and FIG. 2A may not show a transmission process of the data packet whose sequence number is N3.

If it is determined that M1 is greater than N1 and less than N2, by performing the following step 203, whether the data packet whose sequence number is M1 is an out-of-order packet or a retransmitted packet corresponding to the upstream packet loss is determined.

Step 203: The detection apparatus determines whether T2−T1 is greater than or equal to an RTT, and if T2−T1 is greater than or equal to the RTT, determines that the data packet whose sequence number is M1 is a retransmitted packet corresponding to the upstream packet loss; that is, the data packet that was sent by the sending device before and whose sequence number is M1 is lost between the sending device and the detection apparatus, and a currently received data packet whose sequence number is M1 is the retransmitted packet. T1 is a time at which the detection apparatus receives the data packet whose sequence number is N2, T2 is a time at which the detection apparatus receives the data packet whose sequence number is M1, and the RTT is a two-way latency between the sending device and the receiving device. For a specific manner in which the RTT is determined, refer to the specific embodiment in the following Embodiment 2.

When it is determined that the data packet whose sequence number is M1 is a retransmitted packet corresponding to the upstream packet loss, a quantity of lost upstream packets may be added by one, or the quantity of all lost packets may be added by one. In addition, if T2−T1 is less than the RTT, it is determined that the data packet whose sequence number is M1 is an out-of-order packet. Because the out-of-order packet can be identified, packet loss misdetection can be eliminated, so that packet loss detection can be implemented more accurately, and in addition, an out-of-order situation can be detected, so that transmission performance detection can be implemented more comprehensively and accurately.

In addition, a same sequence number black hole may include more than one data packet. Therefore, after the data packet whose sequence number is M1 is received, another data packet (whose sequence number is assumed to be M2, and usually, M2 is greater than M1) in the same sequence number black hole may be further received. In a first implementation, when it is determined that the data packet whose sequence number is M1 is a retransmitted packet corresponding to the upstream packet loss, it may be directly determined that the data packet whose sequence number is M2 is also a retransmitted packet corresponding to the upstream packet loss; however, after it is determined that the data packet whose sequence number is M1 is an out-of-order packet, a time at which the detection apparatus receives the data packet whose sequence number is M2 is expressed as T2, and then whether the data packet whose sequence number is M2 is an out-of-order packet or a retransmitted packet corresponding to the upstream packet loss is determined by performing step 203. In a second implementation, for each data packet (whose sequence number is assumed to be W) that falls into the foregoing sequence number black hole, a time at which the detection apparatus receives the data packet whose sequence number is W is expressed as T2, and then whether the data packet whose sequence number is W is an out-of-order packet or a retransmitted packet corresponding to the upstream packet loss is determined by performing step 203.

Further, the method may further include step 204.

Step 204: After a detection period ends, the detection apparatus performs statistics collection on packet loss indicators in the detection period.

In step 204, statistics collection can be performed on one or more of the following: an upstream packet loss rate UPLR, a downstream packet loss rate DPLR, or a total packet loss rate TPLR.

The upstream packet loss rate UPLR in the detection period may be determined based on a quantity of lost upstream packets ULNum in the detection period, where the quantity of lost upstream packets ULNum is a quantity of data packets that are lost between the sending device and the detection apparatus. Specifically, the upstream packet loss rate UPLR may be calculated by using the following formula: UPLR=ULNum/TNum, where TNum is a quantity of all data packets that are received in the detection period and that are sent by the sending device through the connection.

The total packet loss rate TPLR in the detection period may be determined based on a quantity of all lost packets TLNum in the detection period, where the quantity of all lost packets is a quantity of data packets that are lost between the sending device and the receiving device. Specifically, the total packet loss rate TPLR may be calculated by using the following formula: TRLR=TLnum/TNum.

Specifically, after a detection period ends, the downstream packet loss rate DPLR in the detection period may be determined based on a quantity of lost downstream packets DLNum in the detection period, where the quantity of lost downstream packets is a quantity of data packets that are lost between the detection apparatus and the receiving device. Specifically, the downstream packet loss rate DPLR may be calculated by using the following formula: DPLR=DLNum/TNum. If only the quantity of lost upstream packets and the quantity of all lost packets are counted in step 202 and step 203, the quantity of lost downstream packets DLNum can be calculated based on ULNum and TLNum. According to Embodiment 1 of the present disclosure, by identifying a sequence number of a received data packet and a time at which the data packet is received, the detection apparatus can perform packet loss detection itself, so that implementation is easy and efficiency is relatively high.

FIG. 3A and FIG. 3B are schematic flowcharts of a method according to Embodiment 2 of the present disclosure. Latency detection can be implemented by using the method. In Embodiment 2 of the present disclosure, a detection apparatus may be built into or deployed in a bypass mode on any transmission device in a communications system 100. As shown in FIG. 3A and FIG. 3B, the method provided in Embodiment 2 of the present disclosure includes the following steps.

It should be noted that FIG. 3A shows merely an example in which the detection apparatus is deployed in the bypass mode on the transmission device for illustration, and a step of sending, by the transmission device on which the detection apparatus is deployed in the bypass mode, a received packet to the detection apparatus in a mirroring way and a step of sending the received packet to the receiving device are not performed in a specific order.

Step 301: The detection apparatus obtains a time T3 at which a data packet whose sequence number is K1 and that is sent by a sending device through a connection that is based on a reliable transport protocol and that is established between the sending device and a receiving device is received.

The detection apparatus may obtain, at a preset time interval, a time at which a current data packet is received, for example, obtain, at a time interval of 10 seconds, a time at which a current data packet is received. The detection apparatus may alternatively obtain, at a specified time or when receiving a detection instruction, the time at which the current data packet is received.

For example, a data packet whose sequence number is 2001 is currently received, and a time T3 at which the data packet is received is obtained.

Step 302: When the detection apparatus determines that a target acknowledgment packet sent by the receiving device through the connection is received, a time T4 at which the detection apparatus receives the target acknowledgment packet is obtained, where the target acknowledgment packet is a first acknowledgment packet that is received by the detection apparatus and that indicates that the receiving device has received the data packet whose sequence number is K1 or a data packet following the data packet whose sequence number is K1.

When the reliable transport protocol is a transmission control protocol TCP or a stream control transmission protocol SCTP, the target acknowledgment packet may be specifically the first acknowledgment packet that is received by the detection apparatus and whose value of a latest right edge field of an acknowledgment number field or a SACK field is greater than or equal to K1+LenK1, where LenK1 is a payload length of the data packet whose sequence number is K1.

An acknowledgment number is carried in the acknowledgment number field of the acknowledgment packet.

If both the data packet whose sequence number is K1 and a data packet followed by the data packet whose sequence number is K1 are successfully received by the receiving device, the target acknowledgment packet is usually the first acknowledgment packet that is received by the detection apparatus and whose value of the acknowledgment number field included in the first acknowledgment packet is greater than or equal to K1+LenK1.

If the data packet whose sequence number is K1 is successfully received by the receiving device but one or more data packets whose sequence numbers are less than K1 are lost, the target acknowledgment packet is usually the first acknowledgment packet that is received by the detection apparatus and whose value of the latest right edge field of the SACK field included in first acknowledgment packet is equal to K1+LenK1, or may be the first acknowledgment packet that is received by the detection apparatus and whose value of the latest right edge field of the SACK field included in first acknowledgment packet is greater than K1+LenK1.

If the data packet whose sequence number is K1 is lost, the target acknowledgment packet is usually the first acknowledgment packet that is received by the detection apparatus and whose valued of the latest right edge of the SACK field included in the first acknowledgment packet is greater than K1+LenK1.

It is assumed that an adjacent data packet before the data packet whose sequence number is K1 is a data packet whose sequence number is K2 and whose payload length is LenK2. An acknowledgment number carried in the acknowledgment packet used to acknowledge the data packet K2 followed by the data packet whose sequence number is K1 may be specifically K1 (that is, K1 is equal to K2+LenK2). The acknowledgment packet that is sent by the receiving device to the sending device and in which the acknowledgment number K1 is carried is used to indicate that the data packet whose sequence number is K2 has been received. If the receiving device does not receive the data packet whose sequence number is K1 in a preset period, the receiving device sends again the acknowledgment packet in which the acknowledgment number K1 is carried (which is referred to as a duplicate acknowledgment packet below) until the data packet whose sequence number is K1 is received.

It should be noted that, if a data packet whose sequence number is greater than K1 is also received before the duplicate acknowledgment packet is sent, a SACK field of the duplicate acknowledgment packet may carry information used to indicate that the data packet whose sequence number is greater than K1 has been received. For example, if the receiving device successively receives data packets whose sequence numbers are 1001, 3001, 4001, 5001, 7001, and 8001 and does not receive a data packet whose sequence number is 2001 before receiving the data packet whose sequence number is 8001, an acknowledgment number carried in the sent duplicate acknowledgment packet is 2001 and is used to acknowledge that the data packet whose sequence number is 1001 has been received, and a SACK field of the duplicate acknowledgment packet includes [8001 9001] and [4001 6001], where the [8001 9001] whose left bound is 8001 and whose right bound is 9001 is used to acknowledge that the data packets whose sequence numbers are 7001 and 8001 have been received, and [4001 6001] whose left bound is 4001 and whose right bound is 6001 is used to acknowledge that data packets whose sequence numbers are 3001, 4001, and 5001 have been received, where 9001 is a value of a latest right edge field.

Correspondingly, when a data packet whose sequence number is less than or equal to K1 is lost, the detection apparatus detects the value of the latest right edge field of the SACK field in the duplicate acknowledgment packet after receiving each duplicate acknowledgment packet. Once an acknowledgment packet that carries a latest right edge field of which a value is greater than or equal to K1+LenK1 is detected, DRTT between the detection apparatus and the receiving device may be computed based on a time at which the data packet whose sequence number is K1 is received and a time at which the detected duplicate acknowledgment packet is received.

Step 303: Compute DRTT between the detection apparatus and the receiving device based on T3 and T4.

The two-way latency between the detection apparatus and the receiving device is usually referred to as a downstream two-way latency.

The detection apparatus may compute the DRTT in step 303 directly based on T3 and T4 in a detection process, and specifically, may use a difference between T3 and T4 as the DRTT; or may obtain a plurality of groups of T3 and T4 many times in a statistical period based on the steps prior to step 303, for example, obtain a group of T3 and T4 in each detection period, and compute the DRTT in step 303 based on the plurality of groups of T3 and T4, and specifically, may use an average value of differences between T3 and T4 of all the groups as the DRTT.

In addition, in Embodiment 2 of the present disclosure, URTT (which is usually referred to as an upstream two-way latency) between the sending device and the detection device may be computed in the following manner.

Specifically, before step 301, in a process of establishing, between the sending device and the receiving device, the connection that is based on the reliable transport protocol, one device sends, as a client to another device, a request message used to request for establishment of the connection, and the other device returns, as a server to the client, a response message in response to the request message. The request message may be specifically an SYN message, and correspondingly, the response message may be an SYN ACK message.

In the process of establishing the connection between the sending device and the receiving device, the detection apparatus may receive the request message and the response message that are used to establish the connection, and may compute a latency between the server and the detection apparatus based on a time T5 at which the request message is received and a time T6 at which the response message is received, and specifically, may determine a difference between the T5 and the T6 as the latency between the server and the detection apparatus. If the sending device is used as the server, it is determined that the latency between the server and the detection apparatus is the URTT.

Further, the two-way latency between the sending device and the receiving device may be computed by using RTT=URTT+DRTT.

According to Embodiment 2 of the present disclosure, the detection apparatus computes the latency based on a time at which a data packet is sent and the time at which the target acknowledgment packet is received. Therefore, the detection apparatus can perform latency detection itself, so that implementation is easy and efficiency is relatively high.

During specific implementation, Embodiment 1 and Embodiment 2 may be implemented in combination. For example, the RTT in step 203 in Embodiment 1 may be specifically computed based on the implementation of Embodiment 2.

It should be noted that, when the detection apparatus is built into the transmission device, in Embodiment 1 and Embodiment 2 of the present disclosure, for the information (for example, the data packet, the acknowledgment packet, the request message, or the response message, which is referred to as information A below) that is received by the detection apparatus and that is transmitted between the sending device and the receiving device, the time at which the detection apparatus receives the information A may be specifically the time at which the transmission device into which the detection apparatus is built receives or sends the information A.

If the detection apparatus is built into a port that is of the device and that is configured to receive the information A, in Embodiment 1 and Embodiment 2 of the present disclosure, the time at which the detection apparatus receives the information A is usually the time at which the device into which the detection apparatus is built receives the information A. Correspondingly, the detection apparatus may use the time at which the information A arrives at the detection apparatus as the time at which the detection apparatus receives the information A, or may use the time at which the transmission device into which the detection apparatus is built receives the information A as the time at which the detection apparatus receives the information A.

If the detection apparatus is built into the port that is of the device and that is configured to receive the information A, in Embodiment 1 and Embodiment 2 of the present disclosure, the time at which the detection apparatus receives the information A is usually the time at which the device into which the detection apparatus is built sends the information A. Correspondingly, the detection apparatus may use the time at which the information A arrives at the detection apparatus as the time at which the detection apparatus receives the information A, or may use the time at which the transmission device into which the detection apparatus is built sends the information A as the time at which the detection apparatus receives the information A.

FIG. 4 is a schematic flowchart of a method according to Embodiment 3 of the present disclosure. Packet loss detection and latency detection can be implemented by using the method. The detection method is applied to a communications system, the communications system includes a sending device, a receiving device, and at least one transmission device, the sending device and the receiving device transmit a packet through a connection that is based on a reliable transport protocol and that is established between the sending device and the receiving device, and the packet is transmitted by using the at least one transmission device. As shown in FIG. 4, the method provided in Embodiment 3 of the present disclosure includes the following steps.

Step 401: A first detection device generates a detection packet and sends the detection packet through the connection, where the detection packet has an empty payload, and the detection packet includes a quantity Num1 of counted packets that the first detection device has sent through the connection in a current detection period.

The first detection device may be specifically the sending device, or may be any transmission device located between the sending device and the receiving device, such as a CR. If the first detection device is a transmission device, Num1 is specifically the quantity of counted packets that the first detection device has transmitted through the connection in the current detection period.

During specific implementation, the first detection device may periodically generate the detection packet, and the current detection period may be a difference between a time at which a previous detection packet is generated and a time at which a current detection packet is generated. If it is determined, based on the detection period, that the detection packet is to be generated after a packet whose sequence number is J1 is sent, a sequence number of the generated detection packet may be J1+LenJ1, and the detection packet may be sent after the packet whose sequence number is J1 is sent.

The counted packets may be all or some packets that are sent by the first detection device to the receiving device through the connection. During specific implementation, the packets sent by the first detection device to the receiving device include a data packet, or may include a packet that does not carry communication data, such as a control packet.

The first detection device may count a quantity of all packets that have been sent to the receiving device through the connection in the current detection period, that is, the counted packets include packets of all types, and the first detection device does not distinguish between the types of packets when counting the quantity of sent packets. Alternatively, the first detection device may count a quantity of packets of a preset type (for example, the data packets) that have been sent to the receiving device through the connection in the current detection period, that is, the counted packets are the packets of the preset type.

Step 402: A second detection device receives the detection packet and determines a quantity Num2 of counted packets that have been received through the connection in the current detection period.

The second detection device may be specifically the receiving device or any transmission device located between the first detection device and the receiving device, such as an OLT. When the second detection device is a transmission device located between the first detection device and the receiving device, Num2 is specifically the quantity of counted packets that the second detection device has transmitted through the connection in the current detection period.

Based on an implementation, in step 401, the first detection device counts the quantity of all packets that have been sent to the receiving device through the connection in the current detection period, and correspondingly, in step 402, the second detection device counts a quantity of all packets that have been received through the connection in the current detection period. In other words, the second detection device does not distinguish between the types of packets when counting the quantity of received packets.

Based on another implementation, in step 401, the first detection device counts the quantity of packets of the preset type that have been sent to the receiving device through the connection in the current detection period, and correspondingly, in step 402, the second detection device counts a quantity of packets of the preset type that have been received through the connection in the current detection period.

After the second detection device determines Num2, step 403 of determining, based on Num1 and Num2, whether one or more of the counted packets transmitted between the first detection device and the second detection device in the current detection period are lost may be performed. Further, a quantity LNum of packets lost between the first detection device and the second detection device in the current detection period may be calculated based on Num1 and Num2, where Num1 is greater than Num2, and specifically, a difference between Num1 and Num2 may be used as LNum. In addition, a packet loss rate between the first detection device and the second detection device may be calculated based on Num1 and Num2. For example, a ratio of LNum to Num1 is used as the packet loss rate between the first detection device and the second detection device.

When the second detection device is the transmission device located between the first detection device and the receiving device, after Num2 is determined, step 404 of adding Num2 to the detection packet, and sending the detection packet may be performed. In other words, the sent detection packet includes Num2.

Both step 403 and step 404 may be performed, or only one of step 403 and step 404 may be performed. When both step 403 and step 404 are performed, there is no specific order between step 403 and step 404. If step 404 is not performed, when the second detection device is the transmission device located between the first detection device and the receiving device, the received detection packet may be directly sent.

It should be noted that, in Embodiment 3 of the present disclosure, the first detection device is a device that generates the detection packet, and the second detection device is a device that receives the detection packet and adds detection data (for example, Num2) to the detection packet. During specific implementation, there may be one or more second detection devices, and when there is a plurality of second detection devices, each second detection device performs step 402 when receiving the detection packet.

According to Embodiment 3 of the present disclosure, when the packet loss detection is performed, each device does not need to report a quantity of counted packets that have been transmitted, so that implementation is easy and efficiency is relatively high.

In step 401, the first detection device may further add a time T1 at which the first detection device generates the detection packet to the detection packet. Correspondingly, in step 402, after receiving the detection packet, the second detection device may further obtain a time T2 at which the detection packet is received, where T1 and T2 are used to compute a one-way latency between the first detection device and the second detection device. After obtaining T2, the second detection device may compute the one-way latency between the first detection device and the second detection device based on T1 and T2, and specifically, may use a difference between T1 and T2 as the one-way latency. When the second transmission device is the transmission device located between the first detection device and the receiving device, T2 may be added to the detection packet before the detection packet is sent.

According to Embodiment 3 of the present disclosure, when the latency detection is being performed, each device does not need to report a time stamp, so that implementation is easy and efficiency is relatively high.

In step 401, the first detection device may further add an identifier Id1 of the first detection device to the detection packet. Correspondingly, in step 402, when the second detection device is the transmission device located between the first detection device and the receiving device, an identifier Id2 of the second detection device may also be added to the detection packet before the detection packet is sent. The identifier of the first detection device and the identifier of the second detection device may be used to determine a transmission path through which the detection packet passes. Further, the first detection device and the second detection device may add sequence numbers that are in an identifier list in the detection packet and that are corresponding to the identifiers of the first detection device and the second detection device to the detection packet. For example, the first detection device adds a sequence number 01 of the first detection device to the detection packet, the first second detection device (that is, the first second detection device that receives the detection packet) adds a sequence number 02 of the first second detection device to the detection packet, the second detection device (that is, the second detection device that receives the detection packet) adds a sequence number 03 of the second detection device to the detection packet, and the rest may be deduced by analogy.

According to the foregoing implementations, the path through which the detection packet passes may also be determined, so that transmission performance can be evaluated more comprehensively and accurately.

In Embodiment 3 of the present disclosure, when the reliable transport protocol is a TCP protocol, specifically, information such as the quantity, the time, and the identifier may be carried by extending a TCP option field in the detection packet. When the detection packet arrives at a second detection device, if a length of the TCP option in the detection packet exceeds limitation of the TCP option, a detection packet whose payload is empty and whose sequence number is the same as that of the detection packet that arrives at the second detection device may further be generated, and the information, such as the quantity, the time, and the identifier, obtained by the device is added to the newly generated detection packet.

During specific implementation, each of the first detection device and the second detection device may add, to the detection packet, one of or any combination of the quantity of counted packets that each device has received or has sent in the current detection period, the time at which each device generates or receives the detection packet, and the identifier of each device.

For example, a CR generates a detection packet and adds, to the detection packet, a quantity of packets that have been transmitted in a current detection period, and a BRAS and an OLT separately add, to the detection packet, the quantity of packets that have been transmitted in the current detection period after receiving the detection packet. Another device or the receiving device may determine, based on the quantity of packets that is separately added by the CR, the BRAS, and the OLT, whether a packet loss occurs between any two of the CR, the BRAS, and the OLT, and a specific quantity of lost packets. Alternatively, any one (for example, the OLT) of the BRAS and the OLT may compute whether a packet loss occurs between an upstream device (for example, CR or BRAS) and the device, and calculate a specific quantity of lost packets.

For another example, a CR generates a detection packet and adds a time at which the detection packet is generated to the detection packet, and a BRAS and an OLT separately add a time at which the detection packet is received to the detection packet after receiving the detection packet. Another device or the receiving device may compute a latency between any two of the CR, the BRAS, and the OLT based on the time separately added by the CR, BRAS, and OLT. Alternatively, anyone (for example, the OLT) of the BRAS and OLT may compute a latency between an upstream device (for example, CR or BRAS) and the device.

For still another example, a CR generates a detection packet and adds an identifier of the CR to the detection packet, and each of a BRAS and an OLT adds an identifier of each device to the detection packet after receiving the detection packet. Another device or the receiving device may determine, according to an identifier list carried in the detection packet, a transmission path through which the detection packet passes. Alternatively, any one (for example, the OLT) of the BRAS and the OLT may determine the transmission path through which the detection packet passes before arriving at the device.

During specific implementation, the sending device may be used as the second detection device, each device located between the sending device and the receiving device may be used as the second detection device, or the receiving device may be used as the second detection device.

It is assumed that a TCP connection between the sending device and the receiving device sequentially passes through three detection points which are a CR, a Bras, and an OLT, and the three detection points detect a data flow sent by the sending device through the TCP connection. The CR inserts a detection packet between transmitted packets at a preset time interval, for example, a packet whose sequence number is 4001 and whose payload length is 0 is inserted after a detection packet whose sequence number is 3001. The TCP option field in the detection packet includes a device sequence number 0 of the CR (which represents the first detection point), a device identifier CR 1, a local time 2345678 at which the detection packet is generated, and a quantity 3 of packets of the data flow that has been transmitted from a time at which a previous detection packet was generated to a current time. The detection packet sequentially passes through the detection point Bras and the detection point OLT. Each detection point may modify the detection packet. Assuming that the Bras adds, to the TCP option field in the detection packet, a device sequence number 1 of the Bras (which represents a second detection point), a device identifier Bras 1, a local time 7645678 at which the detection packet is received, and a quantity 2 of packets of the data flow that has been transmitted from the time at which the previous detection packet was received to a time at which a current detection packet is received. Assuming that the OLT adds, to the TCP option field in the detection packet, a device sequence number 2 of the OLT (which represents a third detection point), a device identifier OLT 1, a local time 8895678 at which the detection packet is received, and a quantity 2 of packets of the data flow that has been transmitted from the time at which the previous detection packet was received to a time at which a current detection packet is received. In this case, it can be obtained from the OLT that in the current detection period, the CR 1 sends a total of three packets to the Bras 1, one packet is lost, correspondingly, a packet loss rate is 1/3, and a one-way latency from the CR 1 to the Bras 1 is 7645678−2345678. The Bras 1 sends a total of two packets to the OLT 1, no packet is lost, correspondingly, a packet loss rate is 0, and a one-way latency from the Bras 1 to the OLT 1 is 8895678−7645678.

If time synchronization is not performed between the detection points, the one-way latency computed according to Embodiment 3 of the present disclosure is a relative one-way latency. The relative one-way latency is used to observe a changed value of a one-way latency, that is, compare a value of a one-way latency with a value of a previous one-way latency or a following one-way latency many times, so as to observe whether the latency becomes higher or lower. Therefore, the relative one-way latency provides a reference for transmission quality evaluation.

Further, based on the solutions in Embodiments 1 to 3 of the present disclosure, fault sectionalization may be implemented, to be specific, a specific location where a fault occurs is determined. An example in which the solutions in Embodiment 1 and Embodiment 2 of the present disclosure are used is as follows. For example, when a user has poor service quality, a control center may deliver a control command to a home gateway of the user to instruct the home gateway to initiate transmission performance detection, for example, to detect upstream and downstream packet loss rates and/or latencies of the home gateway, and then the home gateway may report the detected upstream and downstream packet loss rates and/or latencies to the control center for analyzing. If it is detected by comparison that the downstream packet loss rate and/or the downstream latency are/is higher, it may be determined that a network fault occurs within a home area of the user; alternatively, if it is detected that the upstream packet loss rate and/or the upstream latency are/is higher, it may be determined that the network fault occurs within a network of an Internet service provider (ISP). For another example, when a user has poor service quality, a control center may deliver a control command to a transmission device A (for example, a home gateway) near the receiving device and a transmission device B near the sending device to instruct the transmission device A and the transmission device B to initiate transmission performance detection, and then, it is detected that a downstream packet loss rate of the device A is 1%, an upstream packet loss rate of the device A is 0.1%, a downstream packet loss rate of the device B is 1%, and an upstream packet loss rate of the device B is 0.1%. Therefore, it can be determined based on the result that the downstream packet loss rate of the device A is 1%, that is, packet losses mainly occur at downstream of the device A (for example, within a home network), no packet loss occurs between the device A and the device B, and the upstream packet loss rate of the device B is 0.1%.

Figure 5:
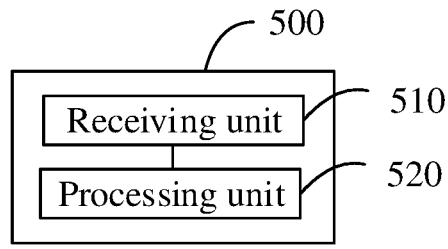
FIG. 5, FIG. 6, FIG. 7A, FIG. 7B, FIG. 7C, and FIG. 8 to FIG. 14 are schematic structural diagrams of an apparatus according to an embodiment of the present disclosure.

According to Embodiment 1 of the present disclosure, Embodiment 4 of the present disclosure provides a detection apparatus 500. As shown in FIG. 5, the detection apparatus 500 includes a receiving unit 510 and a processing unit 520.

The receiving unit 510 is configured to receive a packet transmitted between a sending device and a receiving device through a connection that is based on a reliable transport protocol and that is established between the sending device and the receiving device.

The processing unit 520 is configured to: after the receiving unit 510 successively receives data packets whose sequence numbers are N1 and N2 and that are sent by the sending device through the connection, determine that N2 is greater than N1+LenN1, where LenN1 is a payload length of the data packet whose sequence number is N1; after the receiving unit 510 receives a data packet whose sequence number is M1, determine that a time at which the data packet whose sequence number is M1 is received is later than a time at which the data packet whose sequence number is N2 is received, and determine that M1 is greater than N1 and is less than N2; and when determining that T2−T1 is greater than or equal to an RTT, determine that the data packet whose sequence number is M1 is a retransmitted packet corresponding to an upstream packet loss, where T1 is a time at which the receiving unit 510 receives the data packet whose sequence number is N2, T2 is a time at which the receiving unit 510 receives the data packet whose sequence number is M1, the RTT is a two-way latency between the sending device and the receiving device, and the upstream packet loss is a packet loss occurring between the sending device and the detection apparatus.

The function units described in Embodiment 4 of the present disclosure may be configured to implement operations performed by the detection apparatus in the method described in Embodiment 1. For a specific implementation, refer to the description in Embodiment 1. Details are not described herein again.

Figure 6:
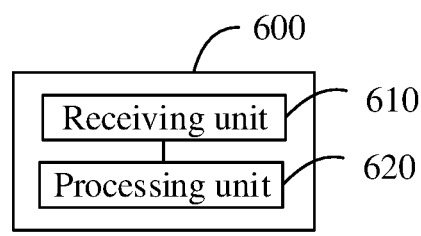

According to Embodiment 2 of the present disclosure, Embodiment 5 of the present disclosure provides a detection apparatus 600. As shown in FIG. 6, the detection apparatus 600 includes a receiving unit 610 and a processing unit 620.

The receiving unit 610 is configured to receive a packet transmitted between a sending device and a receiving device through a connection that is based on a reliable transport protocol and that is established between the sending device and the receiving device, where the reliable transport protocol is a transmission control protocol TCP or a stream control transmission protocol SCTP.

The processing unit 620 is configured to obtain a time T3 at which the receiving unit 610 receives a data packet whose sequence number is K1 and that is sent by the sending device through the connection; and when the receiving unit 610 receives the first acknowledgment packet whose value of a latest right edge field of a selective acknowledgment SACK field included in the first acknowledgment packet is greater than K1+LenK1 and that is used to determine a data packet followed by the data packet whose sequence number is K1, compute a two-way latency between the detection apparatus and the receiving device based on T3 and T4, where T4 is a time at which the receiving unit 610 receives the acknowledgment packet, and LenK1 is a payload length of the data packet whose sequence number is K1.

The function units described in Embodiment 5 of the present disclosure may be configured to implement operations performed by the detection apparatus in the method described in Embodiment 2. For a specific implementation, refer to the description in Embodiment 2. Details are not described herein again.

Figure 7A:
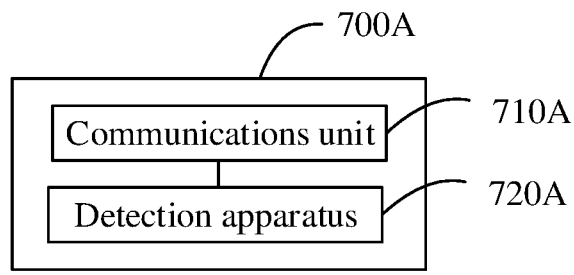

According to Embodiment 2 and Embodiment 3 of the present disclosure, Embodiment 6A of the present disclosure provides a transmission device 700A. As shown in FIG. 7A, the transmission device 700A includes a communications unit 710A and a detection apparatus 720A.

The communications unit 710A is configured to: transmit information transmitted between a sending device and a receiving device, and send the information to the detection apparatus 720A, where the information includes a packet transmitted through a connection that is based on a reliable transport protocol and that is established between the sending device and the receiving device and/or a message used to establish the connection.

The detection apparatus 720A may be specifically the detection apparatus 500 described in Embodiment 4 of the present disclosure. Correspondingly, the communications unit 710A specifically sends the information to the receiving unit 510 of the detection apparatus 720A. Alternatively, the detection apparatus 720A may be specifically the detection apparatus 600 described in Embodiment 5 of the present disclosure. Correspondingly, the communications unit 710A specifically sends the information to the receiving unit 610 of the detection apparatus 720A. For a specific implementation, refer to the descriptions in Embodiment 1 and Embodiment 2. Details are not described herein again.

According to Embodiment 2 and Embodiment 3 of the present disclosure, Embodiment 6B of the present disclosure provides a transmission device 700B. The transmission device 700B is applied to a communications system, the communications system includes a sending device, a receiving device, and the transmission device 700B, the sending device and the receiving device transmit a packet through a connection that is based on a reliable transport protocol and that is established between the sending device and the receiving device, and the packet is transmitted by using the transmission device 700B.

Figure 7B:
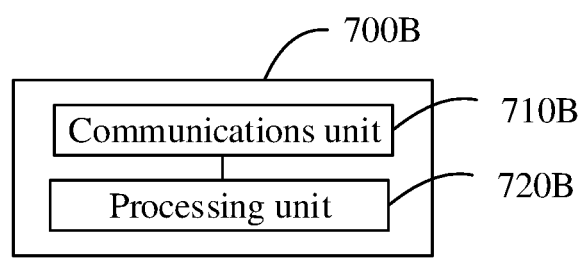

As shown in FIG. 7B, the transmission device 700B includes a communications unit 710B and a processing unit 720B.

The communications unit 710B is configured to transmit the packet transmitted between the sending device and the receiving device through the connection.

The processing unit 720B is configured to: after the communications unit 710B successively receives data packets whose sequence numbers are N1 and N2 and that are sent by the sending device through the connection, determine that N2 is greater than N1 and that N1 and N2 are inconsecutive; and after the communications unit 710B successively receives the data packet whose sequence number is N2 and a data packet whose sequence number is M1, when determining that M1 is greater than N1 and is less than N2 and that T2−T1 is greater than or equal to an RTT, determine that the data packet whose sequence number is M1 is a retransmitted packet corresponding to an upstream packet loss, where T1 is a time at which the communications unit 710B receives or sends the data packet whose sequence number is N2, T2 is a time at which the communications unit 710B receives or sends the data packet whose sequence number is M1, the RTT is a two-way latency between the sending device and the receiving device, and the upstream packet loss is a packet loss occurring between the sending device and the transmission device 700B.

During specific implementation, usually, T1 is the time at which the communications unit 710B receives the data packet whose sequence number is N2, and T2 is the time at which the communications unit 710B receives the data packet whose sequence number is M1; or T1 is the time at which the communications unit 710B sends the data packet whose sequence number is N2, and T2 is the time at which the communications unit 710B sends the data packet whose sequence number is M1.

The function units of the transmission device 700B provided in Embodiment 6B of the present disclosure may be configured to implement operations performed by the detection apparatus in the method described in Embodiment 1. For a specific implementation, refer to the description in Embodiment 1. Details are not described herein again.

According to Embodiment 2 and Embodiment 3 of the present disclosure, Embodiment 6C of the present disclosure provides a transmission device 700C. The transmission device is applied to a communications system, the communications system includes a sending device, a receiving device, and the transmission device, the sending device and the receiving device transmit a packet through a connection that is based on a reliable transport protocol and that is established between the sending device and the receiving device, and the packet is transmitted by using the transmission device.

Figure 7C:
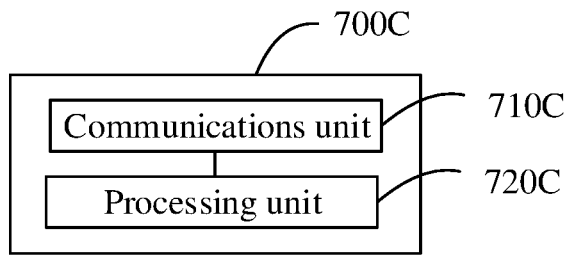

As shown in FIG. 7C, the transmission device 700C includes a communications unit 710C and a processing unit 720C.

The communications unit 710C is configured to transmit a packet transmitted between a sending device and a receiving device through a connection that is based on a reliable transport protocol and that is established between the sending device and the receiving device.

The processing unit 720C is configured to: obtain a time T3 at which the communications unit 710C receives or sends a data packet whose sequence number is K1 and that is sent by the sending device through the connection; when determining that the communications unit 710C receives a target acknowledgment packet sent by the receiving device through the connection, obtain a time T4 at which the communications unit 710C receives or sends the target acknowledgment packet; and compute a two-way latency DRTT between a detection apparatus and the receiving device based on T3 and T4, where the target acknowledgment packet is a first acknowledgment packet that is received by the communications unit 710C and that indicates that the receiving device has received the data packet whose sequence number is K1 or a data packet following the data packet whose sequence number is K1.

When T3 is the time at which the communications unit 710C receives the data packet whose sequence number is K1, T4 is usually the time at which the communications unit 710C sends the target acknowledgment packet. When T3 is the time at which the communications unit 710C sends the data packet whose sequence number is K1, T4 is usually the time at which the communications unit 710C receives the target acknowledgment packet.

The function units of the transmission device 700C provided in Embodiment 6C of the present disclosure may be configured to implement operations performed by the detection apparatus in the method described in Embodiment 1. For a specific implementation, refer to the description in Embodiment 1. Details are not described herein again.

According to Embodiment 3 of the present disclosure, Embodiment 7 of the present disclosure provides a detection device 800. The detection device 800 is applied to a communications system, and the communications system includes a sending device, a receiving device, and at least one transmission device, as shown in the communications system 100 in FIG. 1A and FIG. 1B. The sending device and the receiving device transmit a packet through a connection that is based on a reliable transport protocol and that is established between the sending device and the receiving device, the packet is transmitted by using the at least one transmission device, and the detection device is the sending device or one of the at least one transmission device.

Figure 8:
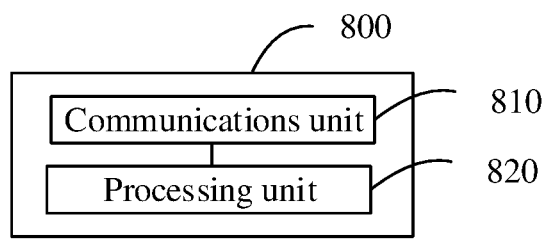

As shown in FIG. 8, the detection device 800 includes a communications unit 810 and a processing unit 820.

The communications unit 810 is configured to transmit a packet through the connection.

The processing unit 820 is configured to: generate a detection packet, and send the detection packet by using the communications unit 820, where the detection packet has an empty payload and includes a quantity Num1 of counted packets that have been sent by using the communications unit in a current detection period, and Num1 is used to determine whether one or more of the counted packets transmitted between the detection device and a downstream device of the detection device in the current detection period are lost.

The function units described in Embodiment 7 of the present disclosure may be configured to implement operations performed by the first detection device in the method described in Embodiment 3. For a specific implementation, refer to the description in Embodiment 3. Details are not described herein again.

According to Embodiment 3 of the present disclosure, Embodiment 8 of the present disclosure provides a detection device 900. The detection device 900 is applied to a communications system, and the communications system includes a sending device, a receiving device, and at least one transmission device, as shown in the communications system 100 in FIG. 1A and FIG. 1B. The sending device and the receiving device transmit a packet through a connection that is based on a reliable transport protocol and that is established between the sending device and the receiving device, and the packet is transmitted by using the at least one transmission device. The detection device is the receiving device or a transmission device that is in the at least one transmission device and that is located between a device configured to generate a detection packet and the receiving device.

Figure 9:
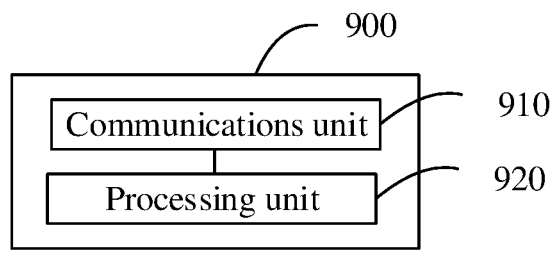

As shown in FIG. 9, the detection device 900 includes a communications unit 910 and a processing unit 920.

The communications unit 810 is configured to transmit a packet through the connection.

The processing unit 820 is configured to: after receiving the detection packet, determine a quantity Num2 of counted packets that the communications unit has received through the connection in a current detection period, where Num2 is used to determine whether one or more of the counted packets transmitted between the detection device and an upstream device or a downstream device of the detection device in the current detection period are lost.

The function units described in Embodiment 8 of the present disclosure may be configured to implement operations performed by the second detection device in the method described in Embodiment 3. For a specific implementation, refer to the description in Embodiment 3. Details are not described herein again.

Figure 10:
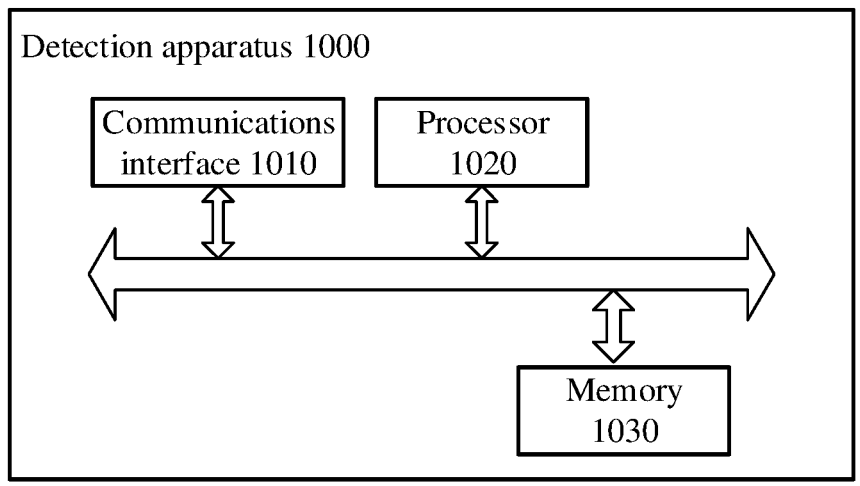

According to Embodiment 1 and Embodiment 2 of the present disclosure, Embodiment 9 of the present disclosure provides a detection apparatus 1000. As shown in FIG. 10, the detection apparatus 1000 includes a communications interface 1010, a processor 1020, and a memory 1030. The communications interface 1010, the processor 1020, and the memory 1030 communicate with each other by using a bus.

The communications interface 1010 is configured to receive information transmitted between a sending device and a receiving device, where the information includes a packet transmitted through a connection that is based on a reliable transport protocol and that is established between the sending device and the receiving device and/or a message used to establish the connection. The communications interface 1010 may be specifically a network adapter.

The memory 1030 is configured to store a computer operation instruction, and may be specifically a high-speed RAM memory or a non-volatile memory.

The processor 1020 is configured to execute the computer operation instruction stored in the memory 1030. The processor 1020 may be specifically a central processing unit (CPU), or an application-specific integrated circuit (ASIC), or be configured as one or more integrated circuits that implement the embodiments of the present disclosure.

The processor 1020 executes the computer operation instruction to enable the detection apparatus 1000 to perform operations performed by the detection apparatus in the method described in Embodiment 1 or Embodiment 2. For a specific implementation, refer to the description in Embodiment 1 or Embodiment 2. Details are not described herein again.

Figure 11:
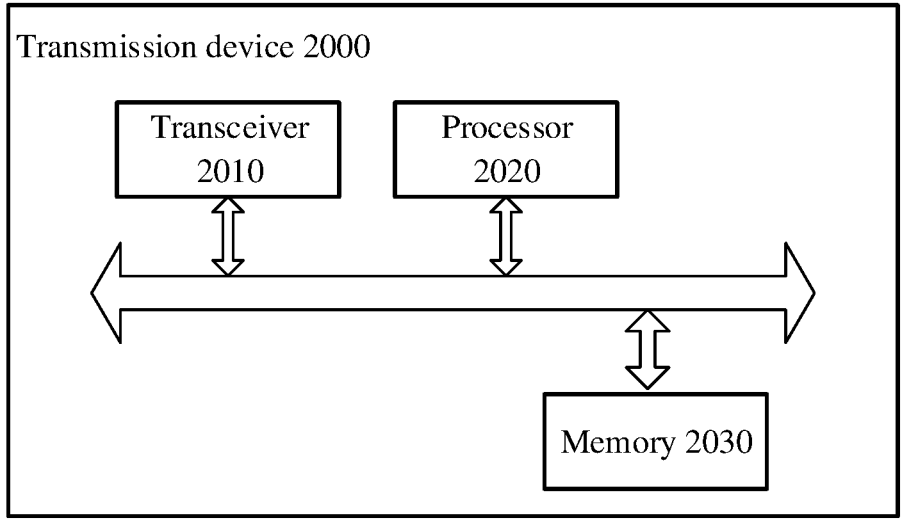

According to Embodiment 1 and Embodiment 2 of the present disclosure, Embodiment 10 of the present disclosure provides a transmission device 2000. As shown in FIG. 11, the transmission device 2000 includes a transceiver 2010, a processor 2020, and a memory 2030. The transceiver 2010, the processor 2020, and the memory 2030 communicate with each other by using a bus.

The transceiver 2010 is configured to: receive information transmitted between a sending device and a receiving device, and transmit the information to the processor 2020, where the information includes a packet transmitted through a connection that is based on a reliable transport protocol and that is established between the sending device and the receiving device and/or a message used to establish the connection. The transceiver 2010 may be specifically a network adapter.

The memory 2030 is configured to store a computer operation instruction, and may be specifically a high-speed RAM memory or a non-volatile memory.

The processor 2020 is configured to execute the computer operation instruction stored in the memory 2030. The processor 2020 may be specifically a CPU or an ASIC, or be configured as one or more integrated circuits that implement the embodiments of the present disclosure.

The processor 2020 executes the computer operation instruction to enable the transmission device 2000 to perform operations performed by the detection apparatus in the method described in Embodiment 1 or Embodiment 2. For a specific implementation, refer to the description in Embodiment 1 or Embodiment 2. Details are not described herein again.

Figure 12:
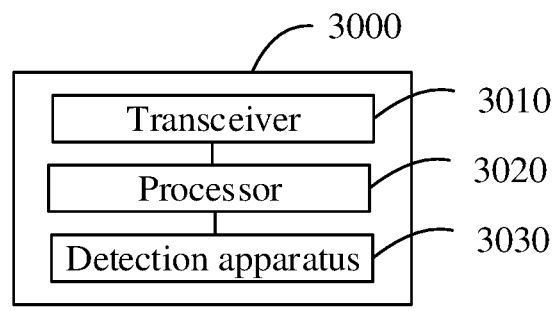

According to Embodiment 1 and Embodiment 2 of the present disclosure, Embodiment 11 of the present disclosure provides a transmission device 3000. As shown in FIG. 12, the transmission device 3000 includes a transceiver 3010, a processor 3020, and a detection apparatus 3030.

The transceiver 3010 is configured to: receive information transmitted between a sending device and a receiving device, and send the information to the processor 3020, where the information includes a packet transmitted through a connection that is based on a reliable transport protocol and that is established between the sending device and the receiving device and/or a message used to establish the connection. The transceiver 3010 may be specifically a network adapter.

The processor 3020 is configured to transmit the information to the detection apparatus. The processor 3020 may be specifically a CPU or an ASIC, or be configured as one or more integrated circuits that implement the embodiments of the present disclosure.

The detection apparatus 3030 may be specifically the detection apparatus 1000 described in Embodiment 9 of the present disclosure. Correspondingly, the processor 3020 specifically sends the information to the communications interface 1010 of the detection apparatus 3030.

According to Embodiment 3 of the present disclosure, Embodiment 12 of the present disclosure provides a detection device 4000. The detection device 4000 is applied to a communications system, and the communications system includes a sending device, a receiving device, and at least one transmission device, as shown in the communications system 100 in FIG. 1A and FIG. 1B. The sending device and the receiving device transmit a packet through a connection that is based on a reliable transport protocol and that is established between the sending device and the receiving device, the packet is transmitted by using the at least one transmission device, and the detection device is the sending device or one of the at least one transmission device.

Figure 13:
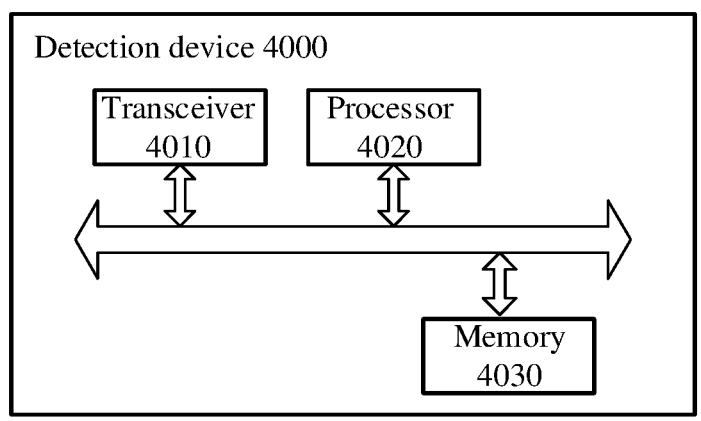

As shown in FIG. 13, the detection device 4000 includes a transceiver 4010, a processor 4020, and a memory 4030. The transceiver 4010, the processor 4020, and the memory 4030 communicate with each other by using a bus.

The transceiver 4010 may be specifically a network adapter.

The memory 4030 is configured to store a computer operation instruction, and may be specifically a high-speed RAM memory or a non-volatile memory.

The processor 4020 is configured to execute the computer operation instruction stored in the memory 4030. The processor 4020 may be specifically a CPU, or an ASIC or be configured as one or more integrated circuits that implement the embodiments of the present disclosure.

The processor 4020 executes the computer operation instruction to enable the detection apparatus 4000 to perform operations performed by the first detection device in the method described in Embodiment 3, and specifically, the processor 4020 receives and sends the packet by using the transceiver.

According to Embodiment 3 of the present disclosure, Embodiment 13 of the present disclosure provides a detection device 5000. The detection device 5000 is applied to a communications system, and the communications system includes a sending device, a receiving device, and at least one transmission device, as shown in the communications system 100 in FIG. 1A and FIG. 1B. The sending device and the receiving device transmit a packet through a connection that is based on a reliable transport protocol and that is established between the sending device and the receiving device, and the packet is transmitted by using the at least one transmission device. The detection device is the receiving device or a transmission device that is in the at least one transmission device and that is located between a device configured to generate a detection packet and the receiving device.

Figure 14:
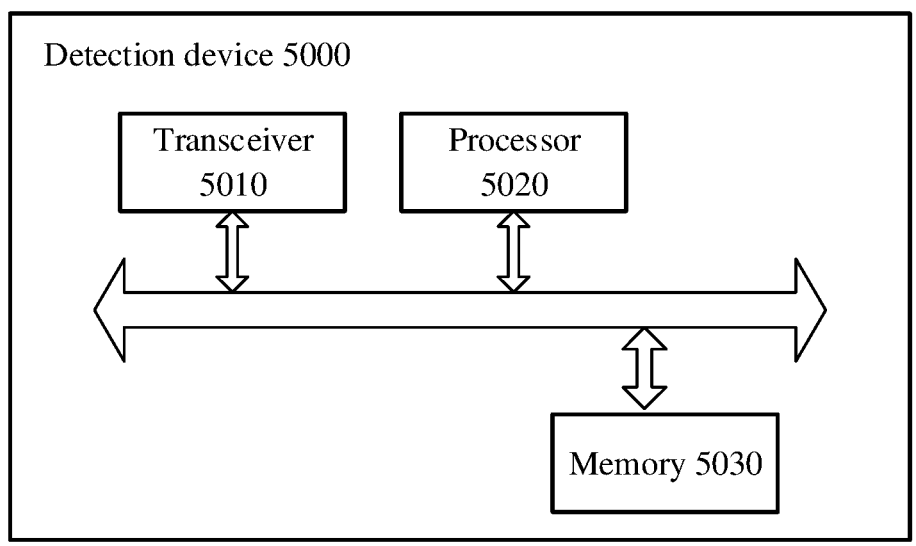

As shown in FIG. 14, the detection device 5000 includes a transceiver 5010, a processor 5020, and a memory 5030. The transceiver 5010, the processor 5020, and the memory 5030 communicate with each other by using a bus.

The transceiver 5010 may be specifically a network adapter.

The memory 5030 is configured to store a computer operation instruction, and may be specifically a high-speed RAM memory or a non-volatile memory.

The processor 5020 is configured to execute the computer operation instruction stored in the memory 5030. The processor 5020 may be specifically a CPU or an ASIC, or be configured as one or more integrated circuits that implement the embodiments of the present disclosure.

The processor 5020 executes the computer operation instruction to enable the detection apparatus 5000 to perform operations performed by the second detection device in the method described in Embodiment 3, and specifically, the processor receives and sends the packet by using the transceiver.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instruction is loaded and executed on the computer, the procedure or functions according to the embodiments of the present disclosure are all or partially generated. The computer may be a general-purpose computer, a dedicated computer, a computer network, or other programmable apparatuses. The computer instruction may be stored in a computer readable storage medium, or may be transmitted from one computer readable storage medium to another computer readable storage medium. The computer readable storage medium can be any usable medium that a computer can access. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

What is claimed is:

1. A method implemented by a detection device and comprising:
   receiving a first data packet that has a sequence number N1 and that is traveling from a sending device, through a connection, and to a receiving device, wherein the connection is based on a reliable transport protocol;
   receiving, successively after receiving the first data packet and at a time T1, a second data packet that has a sequence number N2 and that is traveling from the sending device, through the connection, and to the receiving device;
   determining that N2>N1 and that N1 and N2 are inconsecutive;
   receiving, after receiving the second data packet and at a time T2, a third data packet with sequence number M1, wherein T2>T1;
   computing a round-trip time (RTT) that is a two-way latency between the sending device and the receiving device; and
   determining, when N1<M1<N2 and T2-T1>RTT, that the third data packet is a retransmitted packet corresponding to an upstream packet loss between the sending device and the detection device.

2. The method of claim 1, further comprising determining, when M1 >N1 and T2-T1<RTT, that the third data packet is out of order.

3. The method of claim 1, further comprising:
   receiving, successively after receiving the third data packet, a fourth data packet with sequence number N3, wherein N3≥ N2; and
   determining, when M1<N3 and M1 does not belong to any sequence number black hole, that the third data packet corresponds to a downstream packet loss,
   wherein the sequence number black hole is a sequence number range bounded by sequence numbers of a pair of data packets that are successively received but whose sequence numbers are inconsecutive.

4. The method of claim 1, wherein before determining that the third data packet is the retransmitted packet, the method further comprises:
   determining a two-way latency (URTT) between the sending device and the detection device;
   receiving, at a time T3, a fourth packet that has a sequence number K1 and that is traveling from the sending device, through the connection, and to the receiving device;
   receiving, at a time T4, a target acknowledgment packet traveling from the receiving device, through the connection, and to the sending device, wherein the target acknowledgment packet is a first acknowledgement packet received by the detection device and indicating that the receiving device has received the fourth packet or another packet with a sequence number after K1;
   computing, based on T3 and T4, a two-way latency (DRTT) between the detection device and the receiving device; and
   further computing RTT based on a formula RTT=URTT+DRTT.

5. The method of claim 4, wherein the reliable transport protocol is Transmission Control Protocol (TCP) or Stream Control Transmission Protocol (SCTP), wherein the target acknowledgment packet is a first acknowledgment packet received by the detection device and comprising a latest right edge field of an acknowledgment number field or a selective acknowledgment (SACK) field with a value V, wherein V>K1+LenK1, and wherein LenK1 is a payload length of the fourth packet.

6. The method of claim 4, further comprising:
   receiving, from the receiving device, at a first time, and when the receiving device is a client device and the sending device is a server, a request message requesting establishment of the connection;
   receiving, from the sending device, at a second time, and in response to the request message, a response message; and
   further determining URTT as a difference between the first time and the second time.

7. A method implemented by a detection device and comprising:

receiving, at a first time T3, a first data packet that has a sequence number K1 and that is traveling from a sending device, through a connection, and to a receiving device, wherein the connection is based on a reliable transport protocol;

obtaining the first time T3;

receiving, at a first time T4, a first target acknowledgment packet that is traveling from the receiving device, through the connection, and to the sending device, wherein the first target acknowledgment packet is a first acknowledgment packet received by the detection device and indicating that the receiving device has received the first data packet or another packet with a sequence number after K1;

obtaining the first time T4;

obtaining a second time T3 of a second data packet and a second time T4 of a second target acknowledgment packet, wherein the second data packet has a sequence number K2 and is traveling from the sending device, through the connection, and to the receiving device, wherein the second target acknowledgment packet that is traveling from the receiving device, through the connection, and to the sending device, wherein the second target acknowledgment packet is a first acknowledgment packet received by the detection device and indicating that the receiving device has received the second data packet or another packet with a sequence number after K2;

obtaining a plurality of groups of T3 and T4 in a period;

computing a two-way latency (DRTT) between the detection device and the receiving device based on the plurality of groups of T3 and T4;

receiving, from the receiving device, at a first time, and when the receiving device is a client device and the sending device is a server, a request message requesting establishment of the connection;

receiving, from the sending device, at a second time, and in response to the request message, a response message; and determining a two-way latency (URTT) between the sending device and the detection device as a difference between the first time and the second time.

8. The method of claim 7, wherein the reliable transport protocol is Transmission Control Protocol (TCP) or Stream Control Transmission Protocol (SCTP), wherein the first target acknowledgment packet comprises a first latest right edge field of a first acknowledgment number field or a first selective acknowledgment (SACK) field with a value V, wherein V>K1+LenK1, wherein LenK1 is a payload length of the first data packet, wherein the second target acknowledgment packet comprises a second latest right edge field of a second acknowledgment number field or a second SACK field with a value W, wherein W>K2+LenK2, and wherein LenK2 is a payload length of the second data packet.

9. The method of claim 7, further comprising computing a round-trip time (RTT) based on a formula RTT=URTT+DRTT.

10. The method of claim 9, further comprising:

receiving a second data packet that has a sequence number N1 and that is traveling from the sending device, through the connection, and to the receiving device;

receiving, successively after receiving the second data packet and at a time T1, a third data packet that has a sequence number N2 and that is traveling from the sending device, through the connection, and to the receiving device;

determining that N2>N1 and that N1 and N2 are inconsecutive;

receiving, after receiving the third data packet and at a time T2, a fourth data packet with sequence number M1, wherein T2>T1; and determining, when N1<M1<N2 and T2-T1>RTT, that the fourth data packet is a retransmitted packet corresponding to an upstream packet loss between the sending device and the detection device.

11. The method of claim 10, further comprising determining, when M1>N1 and T2-T1<RTT, that the fourth data packet is out of order.

12. The method of claim 10, further comprising:

receiving, successively after receiving the fourth data packet, a fifth data packet with sequence number N3, wherein N3≥ N2; and determining, when M1<N3 and M1 does not belong to any sequence number black hole, that the fourth data packet corresponds to a downstream packet loss, wherein the sequence number black hole is a sequence number range bounded by sequence numbers of a pair of data packets that are successively received but whose sequence numbers are inconsecutive.

13. A detection device comprising:

a memory configured to store instructions; and a processor coupled to the memory and configured to execute the instructions to cause the detection device to:

receive a first data packet that has a sequence number N1 and that is traveling from a sending device, through a connection, and to a receiving device, wherein the connection is based on a reliable transport protocol;

receive, successively after receiving the first data packet and at a time T1, a second data packet that has a sequence number N2 and that is traveling from the sending device, through the connection, and to the receiving device;

determine that N2>N1 and that N1 and N2 are inconsecutive;

receive, after receiving the second data packet and at a time T2, a third data packet with sequence number M1, wherein T2>T1;

compute a round-trip time (RTT) that is a two-way latency between the sending device and the receiving device; and determine, when N1<M1<N2 and T2-T1>RTT, that the third data packet is a retransmitted packet corresponding to an upstream packet loss between the sending device and the detection device.

14. A detection device comprising:

a memory configured to store instructions; and a processor coupled to the memory and configured to execute the instructions to cause the detection device to:

receive, at a first time T3, a first data packet that has a sequence number K1 and that is traveling from a sending device, through a connection, and to a receiving device, wherein the connection is based on a reliable transport protocol;

obtain the first time T3;

receive, a first time T4, a first target acknowledgment packet, wherein the first target acknowledgment packet is traveling from the receiving device, through the connection, and to the sending device, and wherein the first target acknowledgment packet is a first acknowledgment packet received by the detection device and indicating that the receiving device has received the first data packet or another packet with a sequence number after K1;
obtain the first time T4;
obtain a second time T3 of a second data packet and a second time T4 of a second target acknowledgment packet, wherein the second data packet has a sequence number K2 and is traveling from the sending device, through the connection, and to the receiving device, wherein the second target acknowledgment packet is traveling from the receiving device, through the connection, and to the sending device, wherein the second target acknowledgment packet is a first acknowledgment packet received by the detection device and indicating that the receiving device has received the second data packet or another packet with a sequence number after K2;
obtain a plurality of groups of T3 and T4 in a period;
compute a two-way latency (DRTT) between the detection device and the receiving device based on the plurality of groups of T3 and T4;
receive, from the receiving device, at a first time, and when the receiving device is a client device and the sending device is a server, a request message requesting establishment of the connection;
receive, from the sending device, at a second time, and in response to the request message, a response message; and
determine a two-way latency (URTT) between the sending device and the detection device as a difference between the first time and the second time.

15. The detection device of claim 14, wherein the processor is further configured to execute the instructions to cause the detection device to compute a round-trip time (RTT) based on a formula RTT=URTT+DRTT.

16. The detection device of claim 15, wherein the processor is further configured to execute the instructions to cause the detection device to:
receive a second data packet that has a sequence number N1 and that is traveling from the sending device, through the connection, and to the receiving device;
receive, successively after receiving the second data packet and at a time T1, a third data packet that has a sequence number N2 and that is traveling from the sending device, through the connection, and to the receiving device;
determine that N2>N1 and that N1 and N2 are inconsecutive;
receive, after receiving the third data packet and at a time T2, a fourth data packet with sequence number M1, wherein T2>T1; and
determine, when N1<M1<N2 and T2-T1>RTT, that the fourth data packet is a retransmitted packet corresponding to an upstream packet loss between the sending device and the detection device.

17. The detection device of claim 16, wherein the processor is further configured to execute the instructions to cause the detection device to determine that the fourth data packet is out of order when M1>N1 and T2-T1<RTT.

18. The detection device of claim 16, wherein the processor is further configured to execute the instructions to cause the detection device to:
receive, successively after receiving the fourth data packet, a fifth data packet with sequence number N3, wherein N3≥ N2; and
determine, when M1<N3 and M1 does not belong to any sequence number black hole, that the fourth data packet corresponds to a downstream packet loss,
wherein the sequence number black hole is a sequence number range bounded by sequence numbers of a pair of data packets that are successively received but whose sequence numbers are inconsecutive.

19. A computer program product comprising instructions that are stored on a computer-readable medium and that, when executed by a processor, cause a detection device to:
receive a first data packet that has a sequence number N1 and that is traveling from a sending device, through a connection, and to a receiving device, wherein the connection is based on a reliable transport protocol;
receive, successively after receiving the first data packet and at a time T1, a second data packet that has a sequence number N2 and that is traveling from the sending device, through the connection, and to the receiving device;
determine that N2>N1 and that N1 and N2 are inconsecutive;
receive, after receiving the second data packet and at a time T2, a third data packet with sequence number M1, wherein T2>T1;
compute a round-trip time (RTT) that is a two-way latency between the sending device and the receiving device; and
determine, when N1<M1<N2 and T2-T1>RTT, that the third data packet is a retransmitted packet corresponding to an upstream packet loss between the sending device and the detection device.

20. A computer program product comprising instructions that are stored on a computer-readable medium and that, when executed by a processor, cause a detection device to:
receive, at a first time T3, a first data packet that has a sequence number K1 and that is traveling from a sending device, through a connection, and to a receiving device, wherein the connection is based on a reliable transport protocol;
obtain the first time T3;
receive, a first time T4, a first target acknowledgment packet, wherein the first target acknowledgment packet is traveling from the receiving device, through the connection, and to the sending device, and wherein the first target acknowledgment packet is a first acknowledgment packet received by the detection device and indicating that the receiving device has received the first data packet or another packet with a sequence number after K1;
obtain the first time T4;
obtain a second time T3 of a second data packet and a second time T4 of a second target acknowledgment packet, wherein the second data packet has a sequence number K2 and is traveling from the sending device, through the connection, and to the receiving device, wherein the second target acknowledgment packet is traveling from the receiving device, through the connection, and to the sending device, wherein the second target acknowledgment packet is a first acknowledgment packet received by the detection device and indicating that the receiving device has received the second data packet or another packet with a sequence number after K2;
obtain a plurality of groups of T3 and T4 in a period;
compute a two-way latency (DRTT) between the detection device and the receiving device based on the plurality of groups of T3 and T4;
receive, from the receiving device, at a first time, and when the receiving device is a client device and the sending device is a server, a request message requesting establishment of the connection;

receive, from the sending device, at a second time, and in response to the request message, a response message; and determine a two-way latency (URTT) between the sending device and the detection device as a difference between the first time and the second time.

\* \* \* \* \*

UNITED STATES PATENT AND TRADEMARK OFFICE
CERTIFICATE OF CORRECTION

PATENT NO. : 12,101,238 B2
APPLICATION NO. : 16/730465
DATED : September 24, 2024
INVENTOR(S) : Jian Cheng et al.

It is certified that error appears in the above-identified patent and that said Letters Patent is hereby corrected as shown below:

In the Claims

Claim 1, Column 38, Line 7: "and T2 - T1 > RTT," should read "T2 - T1 $\geq$ RTT,"

Claim 5, Column 38, Line 54: "V > K1 + LenK1," should read "V $\geq$ K1 + LenK1,"

Claim 8, Column 39, Line 50: "V > K1 + LenK1," should read "V $\geq$ K1 + LenK1,"

Claim 8, Column 39, Line 54: "W > K2 + LenK2," should read "W $\geq$ K2 + LenK2,"

Claim 10, Column 40, Line 6: "and T2 - T1 > RTT," should read "T2 - T1 $\geq$ RTT,"

Claim 13, Column 40, Line 45: "and T2 - T1 > RTT," should read "T2 - T1 $\geq$ RTT,"

Claim 16, Column 41, Line 51: "and T2 - T1 > RTT," should read "T2 - T1 $\geq$ RTT,"

Signed and Sealed this
Twenty-second Day of October, 2024

Katherine Kelly Vidal
*Director of the United States Patent and Trademark Office*